(12) United States Patent
Dendi et al.

(10) Patent No.: US 6,807,170 B1
(45) Date of Patent: Oct. 19, 2004

(54) SYSTEM AND METHOD FOR IMPLEMENTING USER-TO-USER INFORMATION TRANSFER SERVICES

(75) Inventors: Ranga R. Dendi, Plano, TX (US); Paul D. Litzenberger, Sachse, TX (US); Timothy A. Morgan, Snellville, GA (US); Shailin Sehgal, Allen, TX (US)

(73) Assignee: WorldCom, Inc., Ashburn, VA (US)

( * ) Notice: Subject to any disclaimer, the term of this patent is extended or adjusted under 35 U.S.C. 154(b) by 0 days.

(21) Appl. No.: 09/412,894

(22) Filed: Oct. 5, 1999

Related U.S. Application Data

(63) Continuation-in-part of application No. 09/320,463, filed on May 27, 1999, now Pat. No. 6,195,347, which is a continuation of application No. 08/673,221, filed on Jun. 27, 1996, now Pat. No. 5,912,887.

(51) Int. Cl.⁷ .............................................. H04L 12/50
(52) U.S. Cl. ..................... 370/354; 370/385; 370/462
(58) Field of Search ................................. 370/384, 385, 370/352, 354, 355, 356, 381, 382, 395.2, 400, 462, 463, 522, 524; 379/93.01, 93.04, 221.01

(56) References Cited

U.S. PATENT DOCUMENTS

| | | | |
|---|---|---|---|
| 4,884,269 A | | 11/1989 | Duncanson et al. |
| 5,473,679 A | | 12/1995 | La Porta et al. |
| 5,541,987 A | * | 7/1996 | Topper et al. ............... 379/230 |
| 5,548,589 A | * | 8/1996 | Jeon et al. ................... 370/399 |
| 5,629,974 A | | 5/1997 | Rajala et al. |
| 5,712,903 A | | 1/1998 | Bartholomew et al. |
| 5,721,903 A | | 2/1998 | Anand et al. |
| 5,912,887 A | | 6/1999 | Sehgal |
| 6,188,688 B1 | * | 2/2001 | Buskirk, Jr. ................. 370/389 |
| 6,195,342 B1 | | 2/2001 | Rohani |
| 6,201,965 B1 | * | 3/2001 | Mizell et al. ............... 455/433 |
| 6,504,820 B1 | * | 1/2003 | Oliva ........................ 370/232 |

OTHER PUBLICATIONS

Greg Langdon, Voice over DSL Sound Promising IDG.net site, Aug. 5, 1999.
Efficient Networks, Inc., "Integrated Services from ATM and DSL—Shared Access for Voice and Data", White Paper, June 1999.
Markku Korpi et al., "Supplementary Services in the H. 323 IP Telephony Network", IEEE Communications Magazine vol. 37, No. 7, July 1999, pp. 118–125.
ROLM Functional Specification, "CorNet–VN Interworking Specification," Issue: 1.1/Date: Jul. 26, 1994. pp. 174–181.
Web Site, http://www.efficient.com/solutions/wp–integrated–voice/, Integrated Services from ATM and DSL–Shared Access for Voice and Data, June 1999.
Web site article, Greg Langdon, "Voice over DSL sounds promising", IDG. net site, Aug. 5, 1999 http://www.cnn.com/TECH/computing/9908/05/dslvoice.idg/.

* cited by examiner

*Primary Examiner*—Min Jung

(57) ABSTRACT

A system and method for implementing user-to-user information transfer services over a communications network having switches, a voice network, and a signaling network. The invention establishes a connection path over both the voice network and the signaling network for connections requested by users to follow such that multiple connections may utilize the same connection paths. Each of switches have available a database for tracking and maintaining current connection information for connections with other switches.

36 Claims, 26 Drawing Sheets

SYSTEM AND METHOD FOR IMPLEMENTING USER-TO-USER INFORMATION TRANSFER SERVICES

This application is a continuation-in-part of U.S. application Ser. No. 09/320,463, filed May 27, 1999, now U.S. Pat. No. 6,195,347 which is a continuation of U.S. application Ser. No. 08/673,221, filed Jun. 27, 1996, now U.S. Pat. No. 5,912,887 both of which are incorporating herein by reference in their entirety.

I. BACKGROUND OF THE INVENTION a. Field of the Invention

This invention relates generally to communication networks, and more specifically to a system and method for transferring information among users communicating over a communication network.

b. Acronyms

The written description uses a large number of acronyms to refer to various services and system components. Although generally known, use of several of these acronyms is not strictly standardized in the art. For purposes of this discussion, acronyms therefore will be defined as follows:

ACM Address Complete ISUP Message
ADF Application Data Field—application layer for switch to DAP interface
ANM Answer ISUP Message
B-channel Bearer channel
BRI Basic Rate Interface
CA-TSC Call Associated Temporary Signaling Channel
CCITT Committee Consultif International Telephonique et Telegraphique
CIC Circuit Identification Code
CONN Connect ISUP Message
CPE Customer premises equipment
CPG Call Progress ISUP Message
D-channel Data channel
DAL Direct Access Line
DAP Data Access Point
DSS1 Digital Subscriber Signaling System No. 1
FAA Facility Accepted ISUP Message
FAR Facility Request ISUP Message
FRJ Facility Reject ISUP Message
FTP File Transfer Protocol
IAM Initial Address ISUP Message
IE Information Element
IMT Inter-Machine Trunk
ISDN Integrated Service Digital Network
ISUP ISDN User Part
MA UUI Message Associated User-to-User Information
NCA-TSC Non-Call Associated Temporary Signaling Connection
NSF Network-specific Facilities
OSID Originating Switch Identification
OTG Originating Trunk Group
PRI Primary Rate Interface
REL Release ISUP Message
REL COM Release Complete ISUP Message
RLC Release Complete ISUP Message
RNR Receiver Not Ready
RR Receiver Ready
SS7 Signaling System 7
NSGD Network-specific generic digits
TSID Terminating Switch Identification
TTG Terminating Trunk Group
USI User Service Information
UUI User-to-User Information
UUIE User-to-User Information Element
UUS User-to-User Signaling c. Related Art Prior to the introduction of the Integrated Services Digital Network, or ISDN, the traditional telephone system used the same channel for both signaling and for voice transmission. This method, in traditional telephone systems, is known as in-band signaling, where signaling information for a connection is sent along with the conversation over the same voice channel. This type of signaling occurred in three ways: prior to establishing the conversation path, following the termination of the conversation path, or during the existence of the conversation path. The time required to transition between signaling states and conversation states is essentially unproductive time for the circuit.

By moving the signaling out-of-band in the case of, for example, ISDN, the conversation path becomes more productive. In addition, the ISDN method of signaling in a datagram format is faster and thus ISDN systems can transfer more information. This is accomplished, at least in part, because ISDN typically has at least one single signaling channel for multiple conversation channels.

The ISDN has two transmission methods: primary rate interface (PRI) and basic rate interface (BRI). Primary rate interface typically carries twenty-three bearer channels and one signaling channel. It is possible to have more than twenty-three bearer channels per signaling channel with the limitations being traffic congestion on the signaling channel and limitations of the switching system. Also, there may be multiple signaling channels for a set of bearer channels to provide redundancy. An example of this is a 94B+2D system spanning 4 DS-1 interfaces of 24 channels each. In contrast, basic rate interface carries two bearer channels and a data channel.

User-to-user signaling service exists for users who subscribe to either the basic rate interface or the primary rate interface. With the primary rate interface, multiple voice channels can be served by at least one signaling channel.

The ISDN signaling channel is directed by an originating inter-exchange carrier switch to a first signal transfer point. The signaling channel is then transferred via a signaling network such as the SS7 network to a second signal transfer point. The signaling channel information is then transferred to a terminating inter-exchange carrier switch.

II. SUMMARY OF THE INVENTION

The present invention is directed toward a system and a method for allowing users of a communication network to exchange data via a connection path over the communication network. When a user wishes to transfer data such as user-to-user information to another user, the invention routes the information over either the voice network or the signaling network. As a result, this user-to-user information can be transferred concurrently with or without other network communication, for example, a telephone call. The invention allows for the efficient transfer of multiple data transfers between a pair of switches to occur over a pair of connection paths, one on the voice network and one on the signaling network.

During a typical communication across the network, the users communicate by transferring frames of data across the signaling network. These frames are, for example, ISDN frames or other groupings of data, and can include data such as voice data, modem data or other communication-related data in a voice portion of the block. In addition to this voice portion, one or more of these blocks of data can include a second portion referred to as a signaling portion. It is this signaling portion which contains the user-to-user information.

In accordance with a feature of the invention, it may be offered on a subscription basis at a switch to place functional requirements on signaling traffic, congestion control, billing, fraud management, network management, testing systems and other process within the communication network.

One aspect of the invention examines the signaling portion of the frame of data to determine whether it contains user-to-user information to be transferred from a first user to one or more other users. If there is user-to-user information to be transferred, this data is removed (copied or extracted) from the frame and optionally formatted. One type of formatting performed is packetizing the user-to-user information from one or more frames into one or more packets of user-to-user information. The user-to-user information is then transferred to the recipient via an overlay network.

Another aspect of the invention is congestion control strategy that addresses both network congestion and user congestion.

An object of this invention is to use a communications network more efficiently when transferring information over the signaling network for two different connections between two switches.

Another object of this invention is to allow a first person to communicate via voice with a second person and transmit data to the same or a third person.

A further object of this invention is to provide congestion control to prevent overburdening the communications network, particularly by one individual.

A further object of this invention is to have scalability for future demand and expansion.

An advantage of the invention is that users can transfer user-to-user information without conducting a typical network communication such as a phone call. The user-to-user information may be included in the signaling portion of the frame. Another aspect of the invention detects the user-to-user information, builds a separate block (for example, a packet) of user-to-user information and sends this block via the voice path to the other user.

Another advantage of this invention is the efficient use of a communications network between two switches by using a pair of voice and signaling paths for multiple connections between two switches.

Another advantage of this invention is the ability to handle congestion at the switches or the user's equipment.

Another advantage of this invention is the novel database for maintaining information on the status of connections with other switches from a particular switch.

Another advantage of this invention is the ability to handle multiple connection requests between two switches where the requested connections include temporary signaling connections.

A further advantage of this invention is the mapping of communication messages from messages transmitted from a person to a switch to messages to be transmitted between switches.

Further features and advantages of the present invention, as well as the structure and operation of various embodiments of the present invention, are described in detail below with reference to the accompanying drawings.

III. BRIEF DESCRIPTION OF THE DRAWINGS

The present invention is described with reference to the accompanying drawings. In the drawings, like reference numbers indicate identical or functionally similar elements or steps. Additionally, the left-most digit(s) of a reference number identifies the drawing in which the reference number first appears.

The vertical proximity in the call flow figures indicates the preferred order in which the events occur, but one of ordinary skill in the art will appreciate that some of these events can occur in different orders and/or simultaneously. The vertical distance between events should not be construed as showing the passage of any specific length of time.

IV. DETAILED DESCRIPTION OF THE EMBODIMENTS

At the end of the detailed description are tables and technical information that will be referred to in the following text and that provide additional technical information regarding the exemplary embodiment discussed below. The technical information primarily relates to the various messaging that may occur during any given connection.

a. Overview

The present invention is directed toward a system and a method for handling the transfer of data between two users in a communication network, such as an ISDN network. More specifically, the invention is particularly well suited to transferring large amounts of data between two users who are capable of communicating over the communication network.

According to the invention, the communication network is provided between an originating switch and a terminating switch. The network provides the communication backbone to allow the data to be transferred between the users while the users are communicating using the communication network. The invention is particularly useful for a situation where, for example, two or more users wish to share or transfer data (such as computer files, images, or other data) between them.

The manner in which the network is implemented and utilized is described in detail below. The network preferably includes a signaling network and a voice channel path as shown, for example, in FIGS. 1 and 3. The network may also include an overlay network as shown, for example, in FIG. 3.

Before describing the invention in detail, it is useful to describe an exemplary environment in which the invention can be implemented. In the broadest sense, the invention can be implemented in any communication network. An example of one such communication network is ISDN connected to a primary rate interface(s) (PRI) and/or a basic rate interface(s) (BRI).

Figure 1:
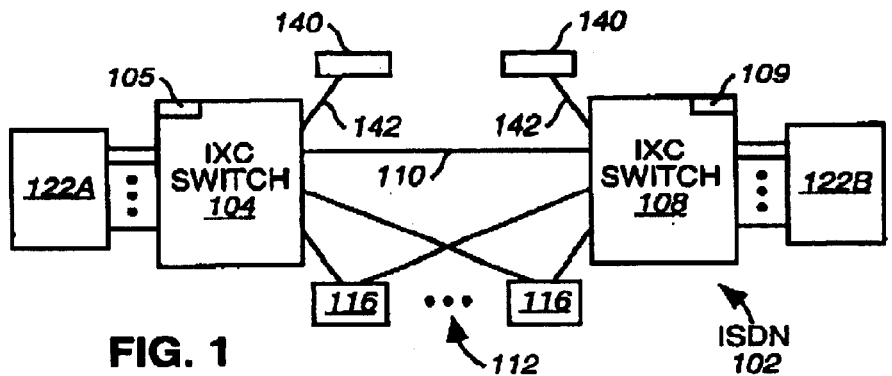
FIG. 1 illustrates a diagram illustrating an ISDN signaling network according to the invention.

FIG. 1 is a block diagram illustrating an example of an ISDN network integrating two users. ISDN network 102 includes an originating inter-exchange carrier switch 104, a terminating inter-exchange carrier switch 108, a signaling network 112 that includes signaling transfer points 116, and a data access point 140. The originating switch 104 includes a database 105. The terminating switch 108 may include a database 109, if desired. ISDN network 102 connects ISDN users having ISDN compatible customer premises equipment (CPE), which includes, but is not limited to, private branch exchanges (PBXs), telephones, modems, Telex, facsimile machines, etc. In FIG. 1, two users (or customers) are contemplated, an originating user having originating customer premises equipment 122A and a terminating user having terminating customer premises equipment 122B.

Figure 2:
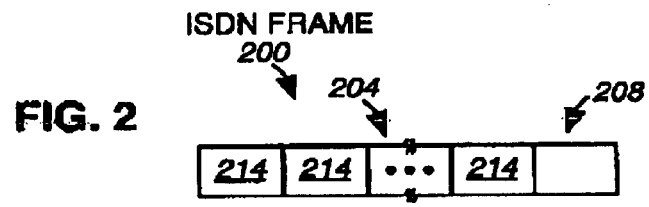
FIG. 2 depicts a diagram illustrating an ISDN frame of data.

FIG. 2 is a diagram illustrating an example of an ISDN frame 200. Frame 200 includes a voice portion and a signaling portion. Voice portion 204, in a typical primary interface, includes twenty-three 8-bit frames, each of which is from a respective bearer channel 214 in a primary interface. Signaling portion 208 includes one 8-bit data frame from a signaling channel in a primary interface. One of ordinary skill in the art based on this disclosure will understand that reference to primary rate interface includes interfaces having multiple bearer channels per each signaling channel as discussed above.

In operation, originating customer premises equipment 122A communicates an ISDN sequence of frames 200 to originating inter-exchange carrier switch 104. The signaling channel of the ISDN sequence is transmitted by originating inter-exchange carrier switch 104 over the signaling network 112 through one or more signaling transfer points 116 to terminating inter-exchange carrier switch 108. Terminating inter-exchange carrier switch 108 communicates the ISDN sequence to terminating customer premises equipment 122B.

The reason the signaling channel is routed through signaling transfer points 116 is to enable an initial arrangement of available switches in the communication network to transport the voice channels. With ISDN, the voice channels are transmitted over voice channel paths or Inter Machine Trunks (IMTs) 110. The transmission occurs directly from originating inter-exchange carrier switch 104 to terminating inter-exchange carrier switch 108 via one or more tandem switches in the telephone network.

The present invention is described in terms of this exemplary environment of an ISDN communication network.

Description in these terms is provided for convenience only. It is not intended that the invention be limited to application only to this exemplary environment. In fact, after reading the following description, it will become apparent to one of ordinary skill in the art how to implement the invention in alternative environments.

b. Optional Architectures

Figure 3:
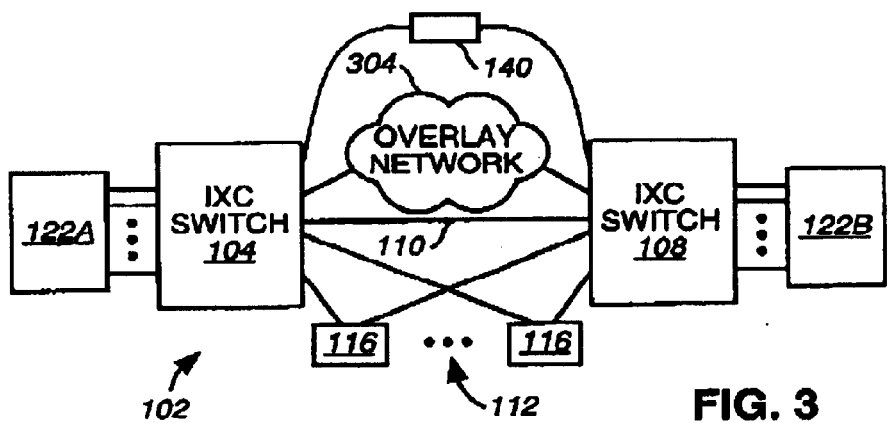
FIG. 3 illustrates a diagram illustrating an overlay network implemented in conjunction with an ISDN signaling network according to one embodiment of the invention.

An overlay network 304 may be provided between originating inter-exchange carrier switch 104 and terminating inter-exchange carrier switch 108 as shown in FIG. 3. The overlay network 304 is understood to represent any network that augments the voice network, and may in fact be a partitioned trunk within the voice network or signaling network. In the discussion that follows about operation of the overlay network, the IMTs 110 may be utilized instead of overlay network 304.

Consecutive one byte data units in the ISDN signaling channel are mapped into a new protocol for transfer across overlay network 304. Overlay network 304 may be, for example, an X.25 network and signaling channel data are mapped into X.25 data packets, although any of several protocols could be used, packet or otherwise. For example, according to one alternative embodiment, the data units are mapped into ATM payloads or cells.

Figure 4:
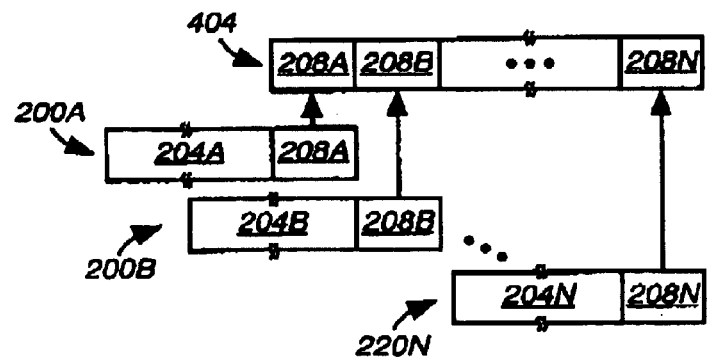
FIG. 4 depicts a diagram illustrating formatting of user-to-user information into a block of data according to a packet embodiment of the invention.

FIG. 4 is a diagram illustrating a packet, or other block of data, used to transfer user-to-user information across overlay network 304 according to one embodiment of the invention. In the example illustrated in FIG. 4, packet 404 is N bytes long. In an exemplary embodiment, N is equal to 251, but N could be any number depending on network parameters and projected length of the data, file or other user data to be transferred in this manner as user-to-user information.

More particularly, FIG. 4 illustrates that the signaling portions 208A, 208B, . . . 208N of N frames 200A, 200B, . . . 200N are removed from their respective frame 200 and inserted into user-to-user information packet 404. Signaling portion 208 is removed from consecutive frames 200 and concatenated in order to form packet 404. When complete, packet 404 is sent from originating inter-exchange carrier switch 104 to terminating inter-exchange carrier switch 108 via overlay network 304.

Figure 5:
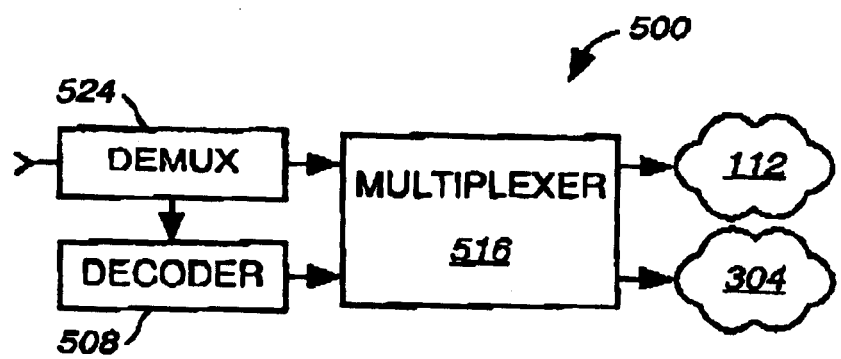
FIG. 5 illustrates a diagram illustrating example architecture for formatting user-to-user information according to one embodiment of the invention.

FIG. 5 is a block diagram illustrating an example architecture for implementing a user-to-user interface system 500 for assembling a data packet 404 for transfer across overlay network 304 according to the invention. FIG. 5 illustrates an example architecture for user-to-user interface system 500 that includes a data decoder 508 and a datapath multiplexer 516.

When a signaling portion 208 of an ISDN frame 200 is received at user-to-user interface system 500, it is decoded by decoder 508 to determine whether user-to-user information to be transmitted to another user is contained in this and subsequent frames 200. If so, decoder 508 triggers the multiplexer 516 to concatenate that signaling portion 208, with the signaling portions 208 of each subsequent frame 200 containing user-to-user information to create packet 404, and to send packet 404 across overlay network 304 to the terminating user. It should be noted that the architecture illustrated in FIG. 5 for the user-to-user interface system 500 is provided by way of example only and that, after reading this description, it will become apparent to one of ordinary skill in the art how to implement the functionality of the invention using alternative architectures.

Figure 6:
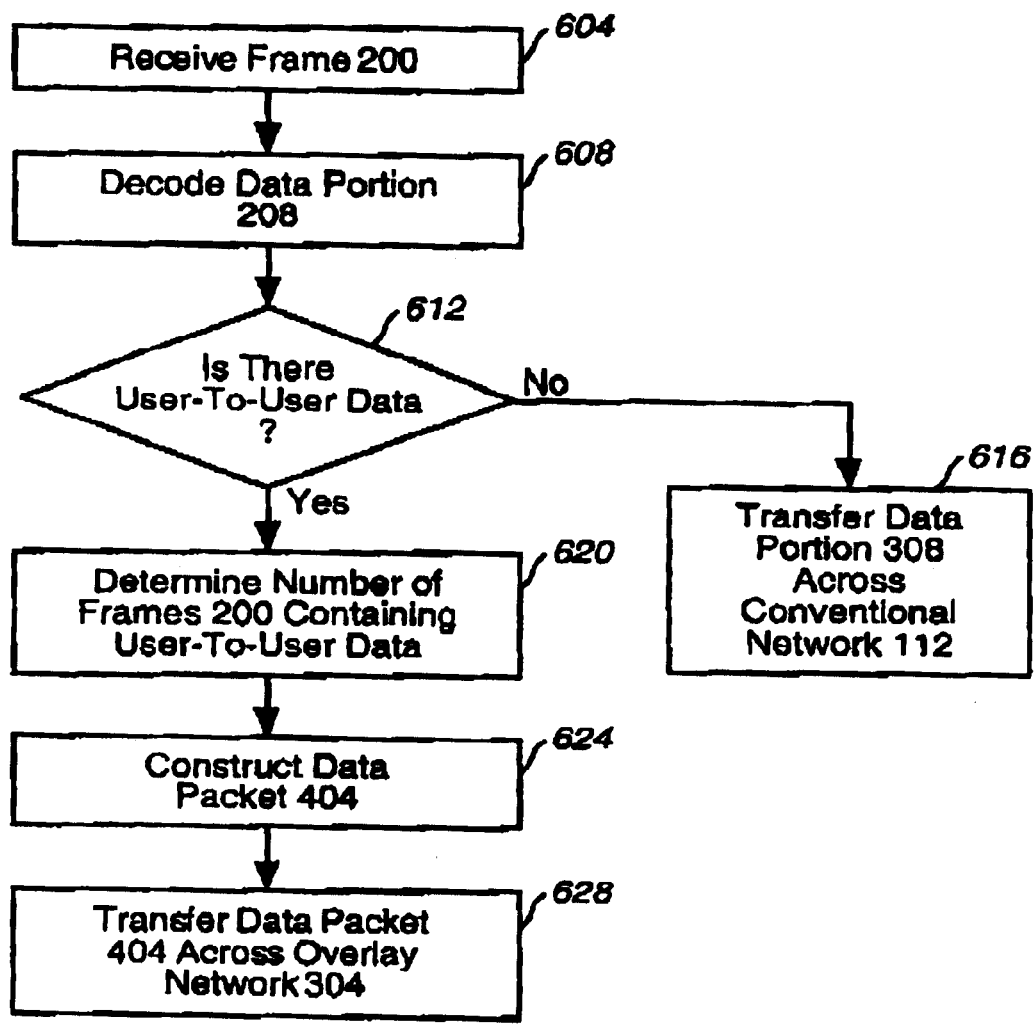
FIG. 6 depicts an operational flow diagram illustrating a process for transferring user-to-user information across an overlay network according to one embodiment of the invention.

FIG. 6 is a flowchart illustrating a process by which user-to-user information from a frame of data is multiplexed into a block and sent across overlay network 304. In the specific embodiment described with reference to FIG. 6, the frame of data is an ISDN frame 200 and signaling portions 208 of relevant frames 200 are multiplexed into packet(s) 408 and sent across overlay network 304 to the terminating user using user-to-user interface system 500. Preferably, user-to-user interface system 500 is located within or otherwise colocated with originating inter-exchange carrier switch 104. To enable initiation of user-to-user information transfers in both directions, the user-to-user interface system 500 is also located within or otherwise colocated with terminating inter-exchange carrier switch 108. For the purposes of this disclosure, the term "located within or otherwise colocated" is synonymous with the term "in communication with."

In step 604, a frame 200 is received at originating inter-exchange carrier switch 104. More specifically, the signaling portion of frame 200 is received by user-to-user interface system 500. User-to-user interface system 500 can also include a demultiplexer 524 to separate signaling portion 208 from voice portion 204 prior to decoding. The demultiplexing is performed when user-to-user interface system 500 receives signaling portion 208.

In step 608, decoder 508 determines whether the received signaling portion 208 contains user-to-user information to be transferred. If there is no user-to-user information to be transferred among users, multiplexer 516 simply transfers signaling portion 208 across the signaling network, e.g., across the signaling network 112, for out-of-band signaling as illustrated by steps 612 and 616. If, on the other hand, decoder 508 determines that received signaling portion 208 contains user-to-user information to be transferred, decoder 508 then determines how many frames 200 contain user-to-user information to be transferred as illustrated by steps 612 and 620.

In step 624, decoder 508 configures multiplexer 516 to begin constructing a packet 404 of user-to-user information. For each signaling portion 208 received containing user-to-user information, multiplexer 516 multiplexes the received signaling portion 208 into the packet 404.

In step 628 when the packet 404 is full, or when there is no further user-to-user information to be transferred, user-to-user interface system 500 transfers packet 404 to the recipient via overlay network 304. More specifically, user-to-user interface system 500 transfers packet 404 to terminating inter-exchange carrier switch 108 for subsequent transfer to the terminating user, i.e., the recipient.

Multiplexer 516 preferably will have the ability to format packet 404 according to a desired protocol for transmission across overlay network 304. For example, multiplexer 516 in the illustrated example is capable of formatting the data to be transferred in accordance with an information transfer protocol such as FTP (File Transfer Protocol).

Preferably for this exemplary embodiment, the frame of data, which includes the user-to-user information, is an ISDN frame 200 and the block into which the user-to-user information is packed is a packet. Of course, the packets may be replaced by other alternative data grouping and/or packaging techniques to achieve a similar result.

c. Temporary Signaling Connection

Now described are some examples of user-to-user information transfer services contemplated in accordance with the invention. The example embodiments discussed below are described in terms of specific messages being transferred among the various elements of network 102. After reading this description, it will become apparent to one of ordinary skill in the art how to implement the invention using alternative messaging or notification techniques. The various methods described maybe accomplished using software and electronics in a variety of combinations based on the following description.

There are multiple ways for data to be transmitted over a communication network including, but not limited to, non-call associated temporary signaling connection, message-associated user-to-user service, and call associated temporary signaling connection. According to this invention, a second connection request between two switches may use the same connection path as a first connection. Accordingly, fewer connections will need to be made between these two switches. The connection path will remain open as long as there is communication of either voice or data flowing through the connection path, and this is accomplished by using a database at each switch to keep track of the other switches on the network currently connected with it and possibly the number of active connections using the same connection path. An example of the type of information in and a possible arrangement of the database is shown in Table 1, which is discussed in more detail later.

Figure 7A:
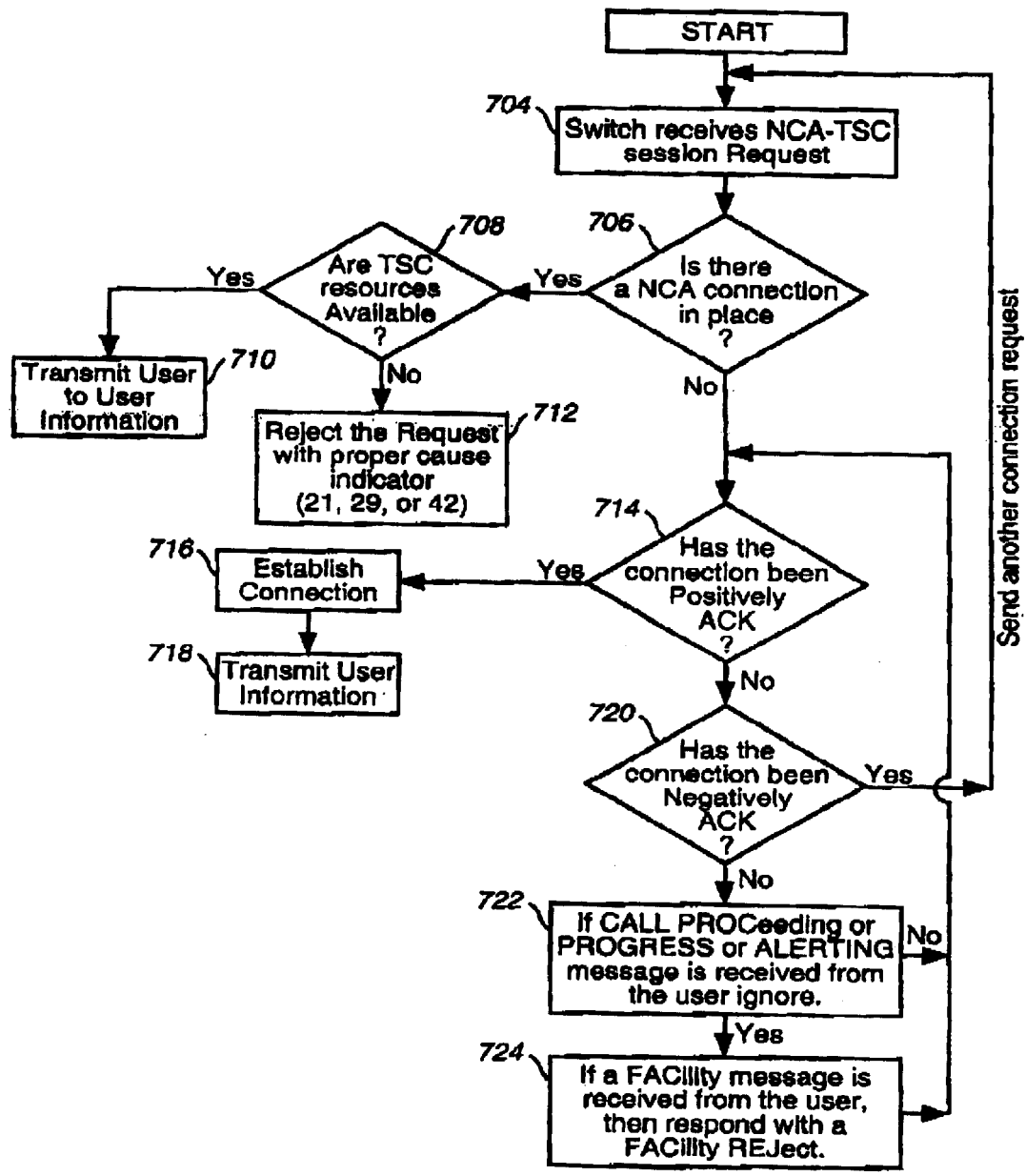
FIG. 7(a) illustrates an operational flow diagram illustrating a non-call associated temporary signaling connection according to the invention.
Figure 7B:
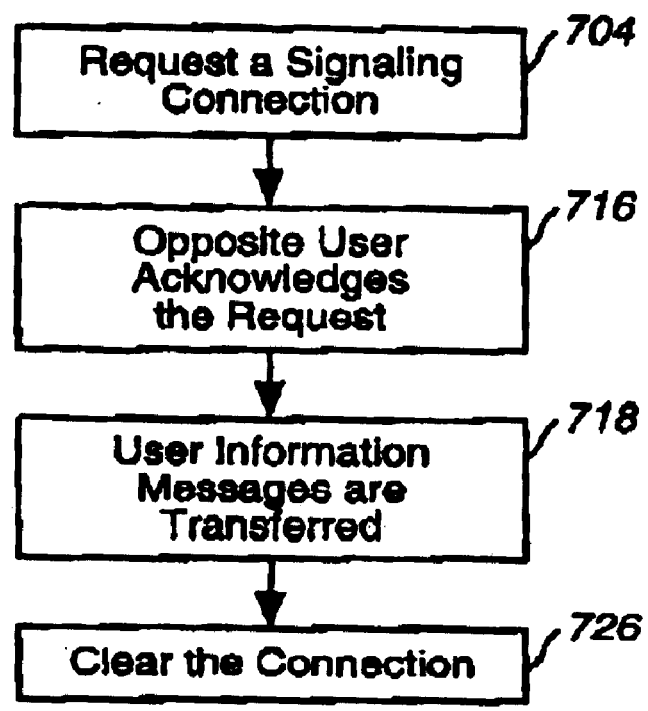
FIG. 7(b) illustrates a simplified operational flow diagram illustrating a non-call associated temporary signaling connection according to the invention.

The non-call associated temporary signaling connection allows users to communicate by means of user-to-user signaling without setting up a circuit-switched connection. However, a temporary signaling connection is established and cleared in a manner that is similar to the control of a circuit-switched connection. FIG. 7 is a flowchart illustrating a non-call associated temporary signaling connection according to the preferred embodiment of the invention. When a temporary signal connection is requested, a voice path is created between the two relevant switches to allow data to be transmitted over the signaling network. The voice path (or voice trunk) is referred to as a SS7 ISUP circuit identification code (CIC) when the signaling network is a SS7 network.

FIGS. 7(*a*) and (*b*) illustrate the steps that occur when establishing a connection between the originating and terminating switches 122A and 122B. In step 704, the originating user 122A requests a non-call associated temporary signaling connection to the terminating user 122B. The originating user sends a setup message identifying that a temporary signaling connection is to be established. The switch 104 checks to see if a connection exists with the switch 108 connected to the terminating user 122B in step 708 by preferably referring to the database 105. If the connection exists, then the switch 104 determines if the resources are available in step 708. If the resources are available, then, in step 710, user-to-user information is exchanged between the originating and terminating users 122A and 122B. Otherwise in step 712, the request is rejected.

In steps 714 through 718, the opposite (non-requesting) user 122B acknowledges the non-call associated temporary signaling connection request and the connection is established to allow for the transmission of user-to-user information. The terminating user 122B and network 102 may positively acknowledge the non-call associated temporary signaling connection request with a connect message. The connect message that is used to acknowledge a non-call associated temporary signaling connection request may be used to transmit user-to-user information (UUI). If desired, the acknowledgment can be required to be received from the opposite user 122B before user-to-user information messages are transmitted in either direction. A terminating user 122B may also send a negative acknowledgment indicating a release or a release complete as illustrated in steps 708 and 712.

Network 102 may reject a non-call associated temporary signaling connection request when the temporary signaling connection resources are busy as illustrated in steps 708 and 712. This can be accomplished by sending a release message or a release complete message indicating the cause of the rejection. These messages may be preceded by a call proceeding message. The terminating user may also reject a non-call associated temporary signaling connection request by responding to the setup message with a release complete message indicating that the facility is rejected.

If network 102 receives a call proceeding message, a progress message, or an alerting message from the terminating user before the connect message or the release complete message, network 102 will ignore these messages as illustrated by step 722. In step 724, if a facility message is received from the terminating user before the connect message or the release complete message, then network 102 responds with a facility reject message indicating that these messages are rejected.

In steps 710 and 718, user-to-user information messages are transferred between the originating and terminating users 122A and 122B. Either user may send user-to-user information messages once the temporary signaling connection has been successfully established. Network 102 transports the user-to-user information messages intact without interpreting the contents. Network 102 may control the flow of user-to-user information messages when necessary. Flow control messages can be originated by network 102, by either user 122A or 122B, or by either switch 104 or 108.

In step 726 shown in FIG. 7(*b*), when the users are finished transferring user-to-user information messages, the non-call associated temporary signaling connection is cleared. Either user employing a release message can initiate clearing of the non-call associated temporary signaling connection. To complete the clearing, the other entity responds with a release complete message. Because there is no call associated with this connection, a B-channel is not in use between the respective customer premises equipment and their respective switch and therefore a disconnect message is not required to disconnect the B-channel.

As described above, user-to-user information is transported via network 102. This transport may be accomplished using two particular network arrangements: (1) transporting user-to-user information messages over the signaling network 112; and (2) transporting user-to-user information messages as voiceband data over IMTs 110.

In the first arrangement, user-to-user information messages will be mapped to ISUP USR messages that will traverse the signaling network 112. If flow control and bandwidth are a concern, then a limited amount (volume and/or number) of user-to-user information message transfer may be allowed per call. Preferably, user-to-user information messages will be subjected to extensive flow control.

In the second arrangement, a transmission path of variable bandwidth, e.g., N×64, will be established in the network over IMTs 110 between the originating and terminating switches. Transporting user-to-user information as voiceband data over IMTs 110 establishes a transmission path, i.e., a voice path, of variable bandwidth in the network 102 between originating switch 104 and terminating switch 108. User-to-user signaling messages are mapped as voiceband data and traverse the established voice path. In other words, in this scenario, the IMTs 110 function as overlay network 304.

Preferably, a message queue is maintained at each switch 104 and 108. Messages on this queue received from different temporary signal connections that are destined for the same terminating switch 108 or 104 will be transferred as voiceband data over the voice path. This path, initially 1×64, will be created between any two switches upon first user-to-user signaling invocation. Subsequent temporary signal connections may also utilize this transmission path. Depending upon the queue size, a particular switch may increase or decrease the bandwidth of this path.

Data integrity issues will arise if MAUUI is invoked in conjunction with non-call associated temporary signal connection since user-to-user information messages may arrive out of sequence with respect to call control messages. Data integrity issues also may arise if user-to-user information messages arrive out of sequence with respect to call control messages, because the same queue and voice path can be used for messages from different temporary signaling connections.

Table 1 shows a template for a non-call associated temporary signal connection database that identifies one ISUP circuit identification code (voice path) between the originating switch and the terminating switch that is shared among multiple temporary signaling connections. This system is easily scaled such that one or more additional ISUP circuits may be opened if there is excessive demand for the established circuit(s).

In the preferred embodiment, for non-call associated temporary signaling connections, a voice path 110 is established on network 102 between originating switch 104 and terminating switch 108. It is not necessary to establish a voice path between the user and the switch. When either user sends a user-to-user information message, a timer is started at each switch 104 and 108. The timer is reset when either user sends another user-to-user information message. Upon expiration of the timer, both the temporary signaling connection path and the temporary voice path are brought down or cleared.

d. Procedure

FIGS. 8–13 illustrate the steps that occur in establishing a non-call associated temporary signal connection between a user located at a customer site 122A (CPE A) connected to a first switch 104 (Switch A) and a second user located at a second site 122B (CPE B) connected to a second switch 108 (Switch B). FIGS. 8–25 illustrate events that may occur after or during the set-up of the non-call associated temporary signal connection and will be discussed later.

Figure 8:
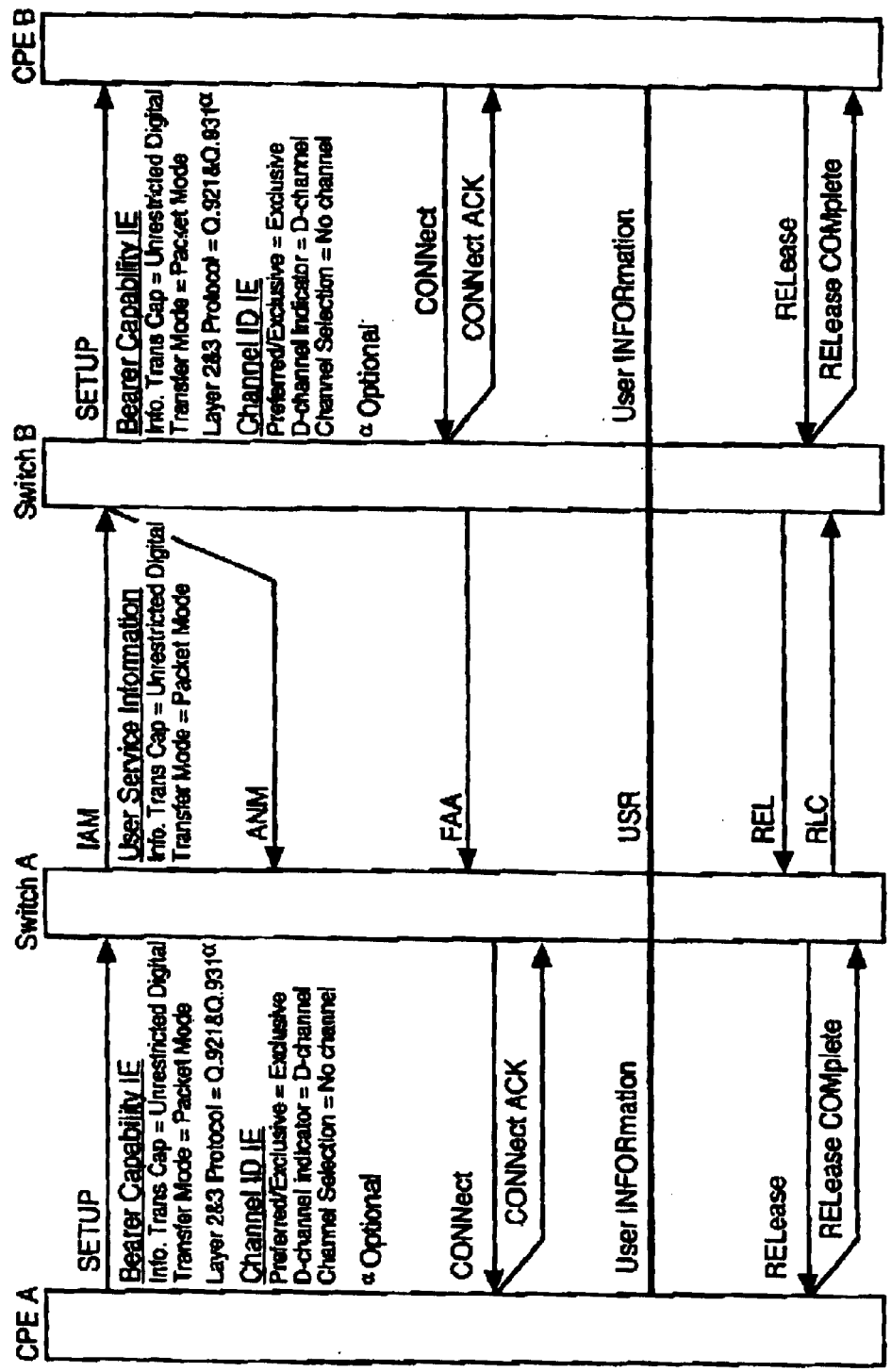
FIG. 8 depicts a complete call flow diagram for the processing that occurs in handling a non-call associated temporary signaling connection.
Figure 9:
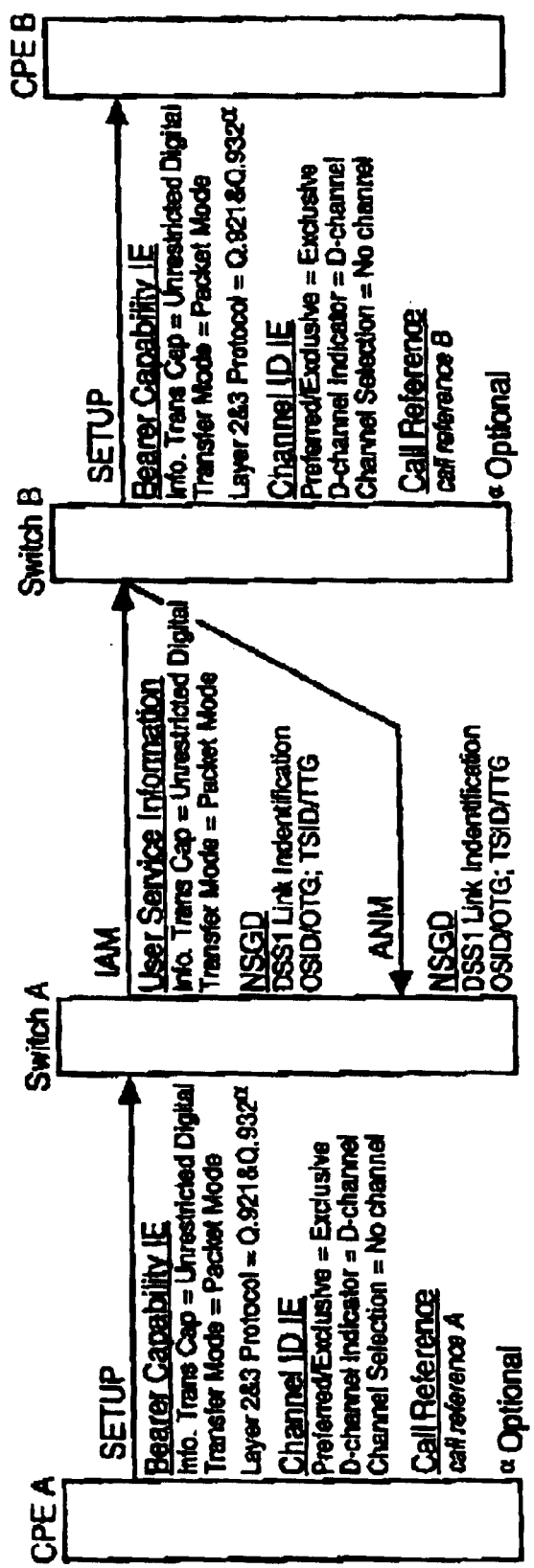
FIG. 9 illustrates a flow diagram for establishing a non-call associated temporary signaling connection.
Figure 10:
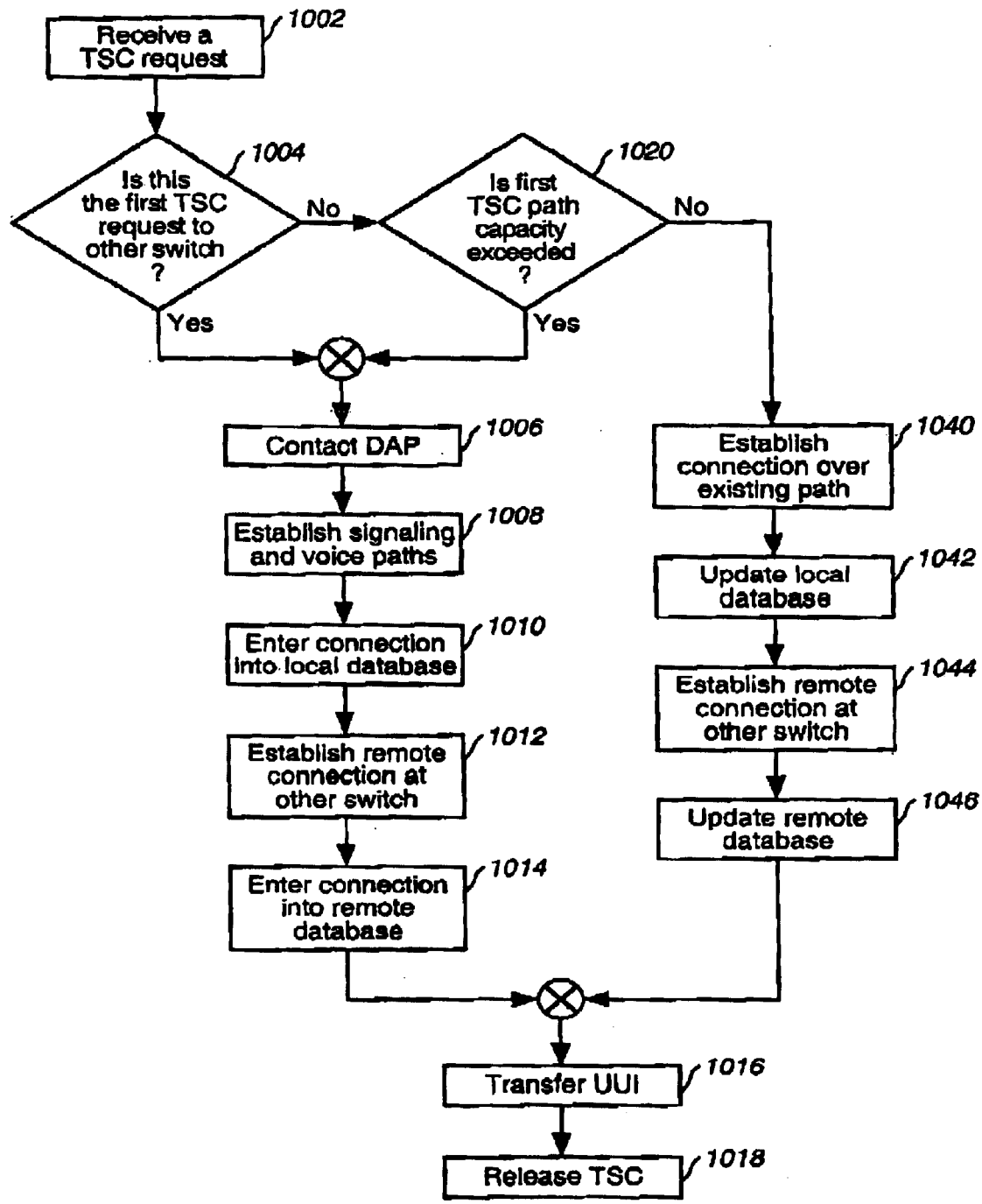
FIG. 10 illustrates an operational flow diagram for the processing that occurs in setting up a temporary signaling connection at a switch.

CPE A transmits the setup message to Switch A as shown, for example, in FIGS. 8 and 9 and step 1002 in FIG. 10. In the preferred embodiment, the setup message preferably includes a bearer capability information element, a channel identification information element, a called party number, and a network-specific facilities information element.

The bearer capability information element can include unrestricted digital information in the information transfer capability field, a packet mode indication in the transfer mode field, and an indication of the user-to-user information layer two and three protocols. Channel identification information element preferably denotes exclusive use of the d-channel and network-specific facilities information element indicates that binary facility coding is non-call associated temporary signaling connection. Preferably, user information layer 2 protocol is Q.921 and user-to-user information layer 3 protocol is Q.931 in the layer and protocol identification field. The user may optionally include these protocol identification fields; however, the network preferably will ignore these fields and only transport the information in these fields. The user may also include a user-to-user information layer 1 protocol in the layer and protocol identification field, but the network will most likely ignore this field also.

The channel identification information element preferably sets exclusive in the preferred/exclusive field, D-channel in the D-channel indicator field, and no channel in the channel selection field.

The user may include a network-specific facility information element to indicate a special service invocation such as toll-free (800/888) service. The user or the network may also set a call reference identifier for data and/or information transmission.

In step 1006, Switch A, upon receiving a setup message indicating a non-call associated temporary signal connection request, will continue to perform call processing of a virtual private network or toll free service. If interworking is required, i.e., at least two switches are involved, then before selecting an outgoing ISUP circuit identification code (CIC) and formulating an initial address message (IAM), the originating switch will determine if there is an existing active non-call associated signaling connection to the terminating switch. This can be accomplished by maintaining a database, having data similar to that shown in Table 1, discussed in more detail later, that stores information on all active non-call associated connections a switch is involved in with other network switches. This information may be utilized to create subsequent connections between Switch A and Switch B and thus to route user-to-user information messages over the same ISUP circuit identification code path.

Otherwise, the switch 104 will contact a data access point (DAP) 140, which is in communication with the switches via a signaling network 142 that can be a second signaling network from the one that connects the various switches. The data access point acts as a medium for providing connection information between two points on a network. The connection information preferably includes terminating switch identification (TSID), terminating trunk group (TTG), and subsequent address information to the originating switch.

In steps 1004 and 1008, if there is not at least one active non-call associated connection between the originating switch and the terminating switch, then the existing ISUP call processing will be used to setup an IMTs path 110 and signaling network 112 between the two switches. The outgoing initial address message will have a user service information (USI) parameter with fields preferably encoded such that the information transfer capability is set to unrestricted digital and the transfer mode is set to packet mode. Initial address message will also preferably contain information about the originating user interface like DSS1 link identification, which carries the local call reference information element of the non-call associated connection between CPE A and Switch A, and the originating switch identification and trunk group at Switch A. These parameters will be used by Switch B to address the correct temporary signaling connection at Switch A. In step 1010, the database will be updated to indicate this newly created temporary signaling connection. The possible fields in the database are shown in Table 1.

Table 1 provides a platform to store and forward the necessary information using the following notation: the variable n represents the total number of network switches; the variables $m_i$, $m_{ii}$, and $m_{iii}$ represent the total number of active non-call associated connections between two switches; the field PRA # applies to DEX-600E implementation only and relates to the D-channel. One of ordinary skill in the art will be able to adjust the database to work with other switches besides DEX-600E, for example, DMS-250.

In step 1012, Switch B, upon receiving the initial address message indicating a request for a non-call associated connection from Switch A, will send a setup message to the called user (CPE B) with information elements encoded as explained in connection with the original setup message sent from CPE A to Switch A. Preferably, an acknowledgment will be received from the opposite user before user-to-user information messages are transmitted in either direction. The acknowledgments are either positive or negative. The positive acknowledgment is a connect message as illustrated, for example, in FIG. 9. The negative acknowledgments are a release message and a release complete message as illustrated, for example, in FIG. 27.

Terminating Switch B will send an answer ISUP (ANM) message to Switch A immediately after sending the setup message to CPE B to acknowledge the connection request. This is necessary to avoid the condition when the terminating CPE B rejects a setup message to invoke the very first non-call associated connection between two switches but accepts another setup message invoking a non-call associated connection that followed immediately. In step 1014, a database similar to the one at Switch A preferably will be maintained at Switch B. Switch B sets the call received state and starts a timer after sending the setup message to CPE B.

Figure 11:
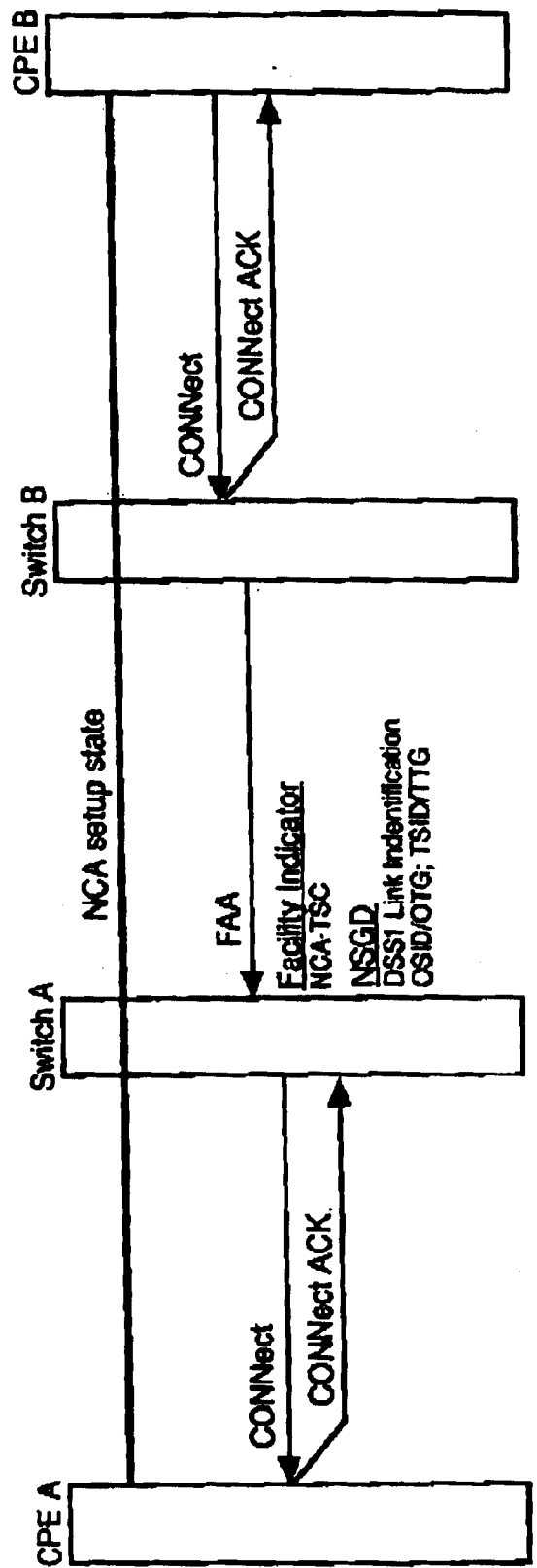
FIG. 11 depicts a flow diagram for acknowledging a request for a non-call associated temporary signaling connection.

Referring to FIGS. 8 and 11, once CPE B acknowledges the request by sending a connect message to Switch B, Switch B will send a connect acknowledge message back to CPE B. Switch B will also send an ISUP facility accepted (FM) message in the backward direction to Switch A indicating the acceptance of the non-call associated connection request by CPE B. The ISUP FM message preferably will include a facility indicator and network-specific generic digits (NSGD). The facility indicator in this example will represent that a non-call associated temporary signal connection has been created. The network-specific generic digits preferably will include a terminating switch identification (TSID), a terminating trunk group (TTG), an originating switch identification (OSID), an originating trunk group (OTG), and a DSS1 link identification. The DSS1 link identification preferably includes an originating interface linkID__1 field (local call reference of the originating user to switch interface) and a terminating interface linkID__2 field (local call reference of the terminating user to switch interface).

In step 1016, after CPE B positively acknowledges non-call associated temporary signal connection request with a connect message, the user-to-user information messages are transferred. Preferably, MA UUI is not present in a connect message used to acknowledge a non-call associated temporary signal connection request. CPE B may begin sending user-to-user information messages after issuing the connect message. Once CPE A receives a connect message, it can begin sending user-to-user information messages.

Switch A, Switch B, or intermediary switches may reject the non-call associated temporary signal connection request from CPE A, because temporary signal connection resources are busy or unavailable. This will be accomplished by the busy switch sending a release message or a release complete message with a cause information indicating cause 29, "facility rejected," or 42, "switching equipment congestion."

Figure 12:
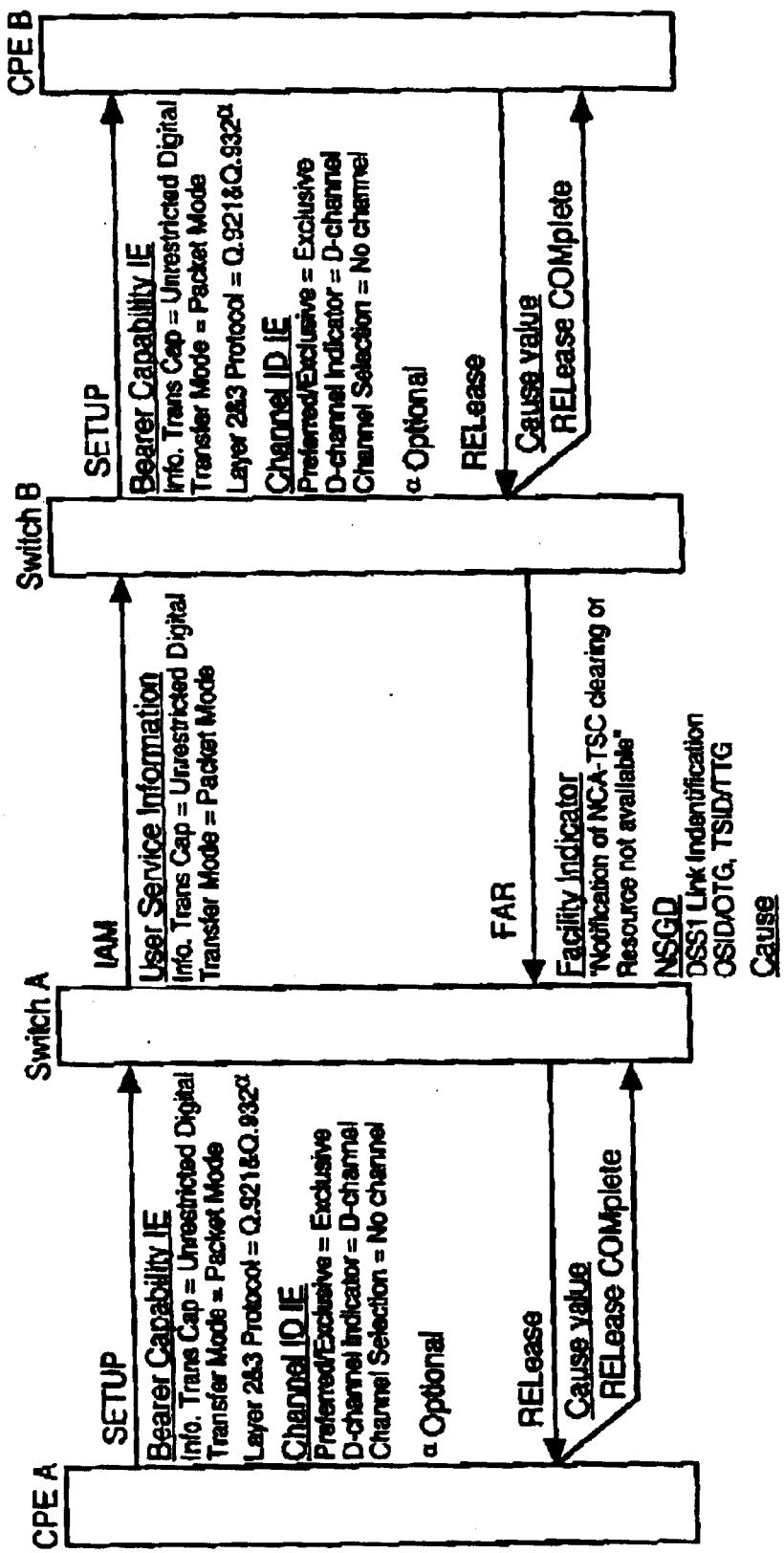
FIG. 12 illustrates a flow diagram for when a non-call associated temporary signaling connection is rejected by the non-requesting party via a release message.
Figure 13:
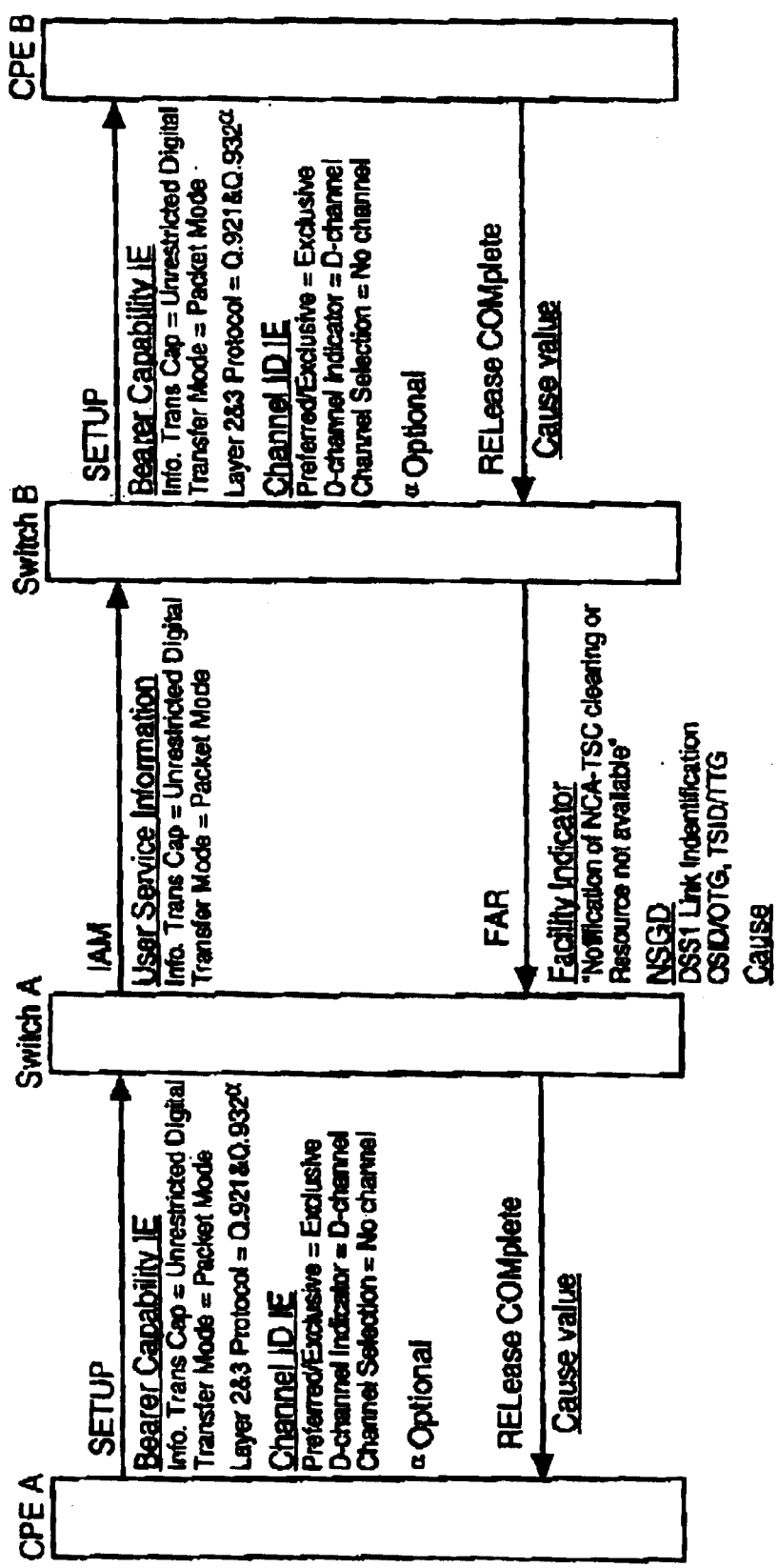
FIG. 13 depicts a flow diagram for when a non-call associated temporary signaling connection is rejected by the non-requesting party via a release complete message.

CPE B may reject a non-call associated temporary signal connection request by sending a release message with a cause information element indicating cause 29, "facility rejected" as shown in FIG. 12. This message may be preceded by a call proceeding message. CPE B may also reject a non-call associated temporary signal connection request by responding to the setup message with a release complete message with cause value of 29, "facility rejected" as shown in FIG. 13.

If Switch B receives a call proceeding message, a progress message, or an alerting message from CPE B before the connect message or the release complete message, then Switch B will ignore these messages locally. If a facility message is received from either CPE A or CPE B before a connect message or a release complete message, then the network (Switch A or Switch B, respectively) will respond with a facility reject message with a cause information indicating cause 29, "facility rejected," or 42, "switching equipment congestion."

Figure 14:
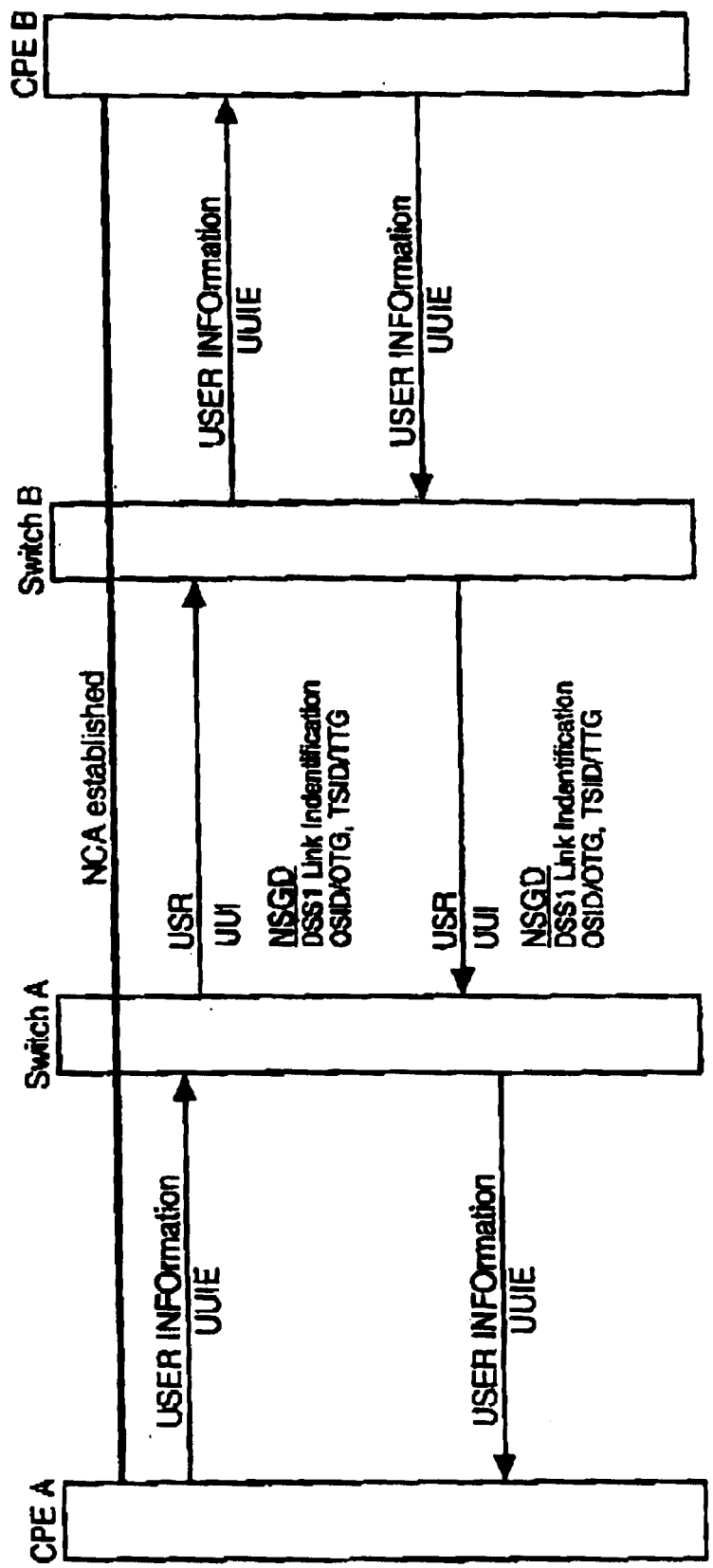
FIG. 14 illustrates a flow diagram showing the transfer of user-to-user information messages across a network.

As shown, for example, in FIG. 14 and by step 1016 in FIG. 10, user-to-user information messages may be sent by either user provided the temporary signal connection has been established successfully. Switches A and B will add addressing information, i.e., the link identification, switch identification and trunk group of the other end, to the USR messages. When using the first arrangement, signaling network 112 will transport user-to-user information messages intact without interpreting the contents as USR messages. When using the second arrangement, IMTs 110 will need the user-to-user information to be put into packets using, for example, user-to-user interface system 500 illustrated in FIG. 5. Any syntax errors contained within the message must be resolved by the end users.

If desired, user-to-user information messages may be limited to a maximum length. If a user-to-user information message exceeds the maximum allowable length, the message will not be transmitted across the network and a status message is sent to the sending user indicating the same. An example of this status message is cause value 43, which correlates to "access information discarded."

The sending of user-to-user information messages does not have to change the state of the call.

e. Congestion and Flow Control

Temporary signaling connections may encounter congestion from either the network or the users. The network 102 preferably will provide flow control to ensure that no single user is allowed to monopolize the network resources, thus affecting service for other users. Therefore, an ideal congestion control strategy addresses both network congestion and user congestion concerns as shown and illustrated, for example, in FIGS. 15–20.

There are three congestion states maintained by the originating and terminating switches: "user," "switch," and "far-end." The "user" congestion state is marked congested if DSS1 congestion control or ISUP CPG messages with a receiver not ready indication is received from the near end of the call, for example, the user. The "switch" congestion state is marked congested as a result of flow control procedures. The "far-end" congestion state is marked congested if an ISUP CPG message with the receiver not ready indication is received from the far-end, for example, the other switch. One of ordinary skill will realize that each of these states may be represented as a Boolean value or other flag mechanism in software.

Preferably, network 102 flow controls the transfer of user-to-user information messages when needed. This is accomplished by means of a congestion control message that contains a congestion level information element indicating the level of congestion on network 102. In the preferred embodiment, two indications of congestion level are specified, for example, "receiver not ready" (RNR) and "receiver ready" (RR).

A level of congestion indication that the receiver is not ready indicates that the user should suspend sending user-to-user information messages across network 102. A congestion level information element indicating that the receiver is ready notifies the sender that the transmission of user-to-user information messages may resume. After having sent an indication that the receiver is not ready, network 102 may discard any user-to-user information messages that are subsequently received.

Preferably, in each direction a burst capability of sending N user-to-user information messages will be available to each user, where N initially equals the value of the burst parameter X. The value of N will decrement by one for each user-to-user information message sent by the user and increment by Y at regular intervals of T subject to the limitation that N will not exceed X.

The burst parameter X in this example will have a default value of 16 and the replenishment parameter Y preferably is X/2 or other similar number. The burst parameter X preferably is determined based on the bandwidth in the network such that information flow is optimized. The replenishment parameter Y preferably provides for optimal use of the network given the value of the burst parameter X.

A timer TUUS is started at the originating and terminating switches to keep track of the passage of time and assist in determining if a user has sent to many messages over a period of time T. Preferably, T has a predetermined value based on particular network specifications and the values of parameters X and Y. Thus the range of T is any positive real number, and preferably T is in a range from 0 seconds up to and including 60 seconds, and most preferably T is in a range from and including 5 seconds up to and including 30 seconds. If a switch within the period T receives more than N user information messages, the excess message(s) will be discarded and congestion control messages will be sent.

Figure 15:
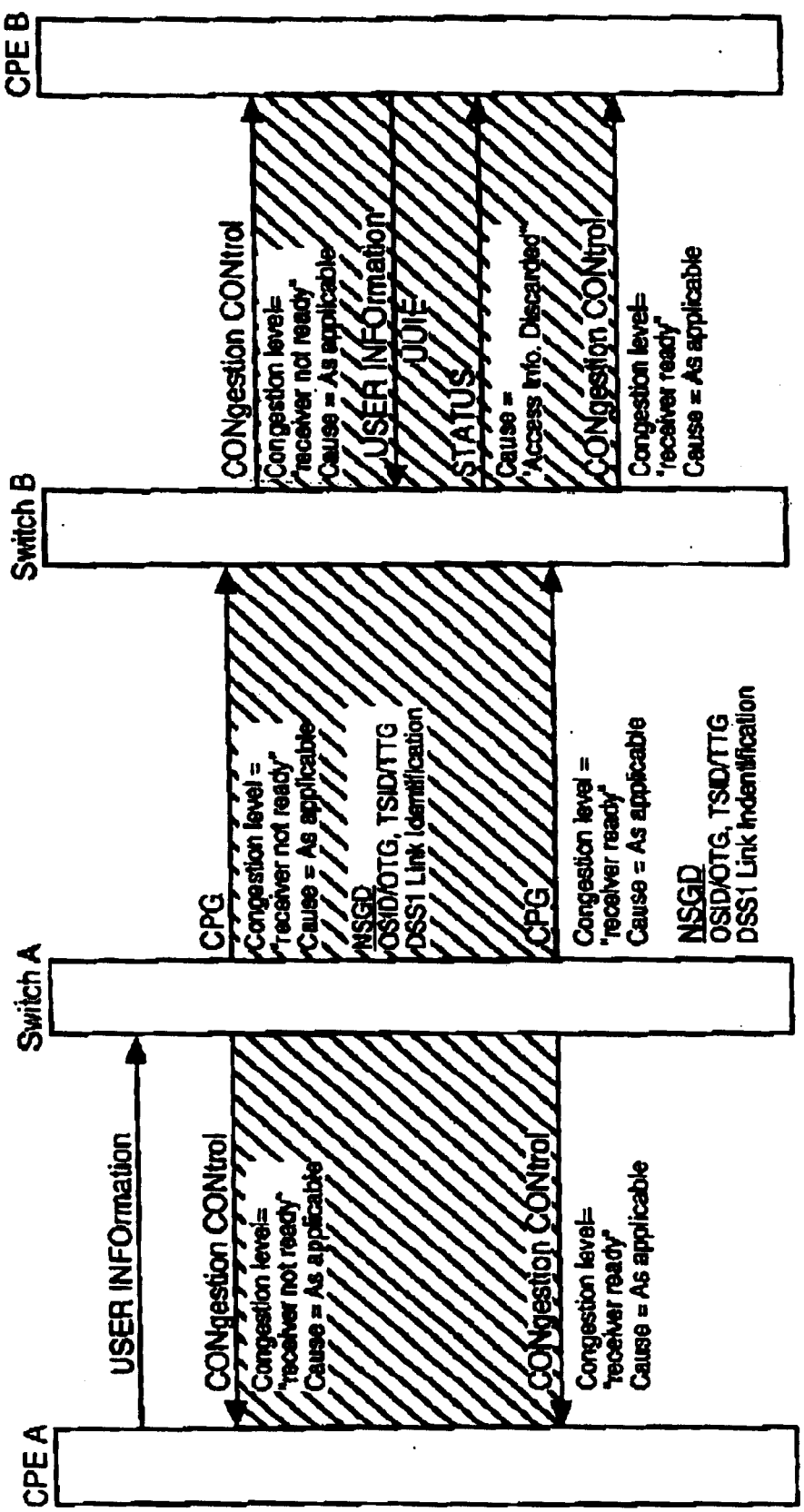
FIG. 15 depicts a flow diagram for when a switch becomes congested.
Figure 16:
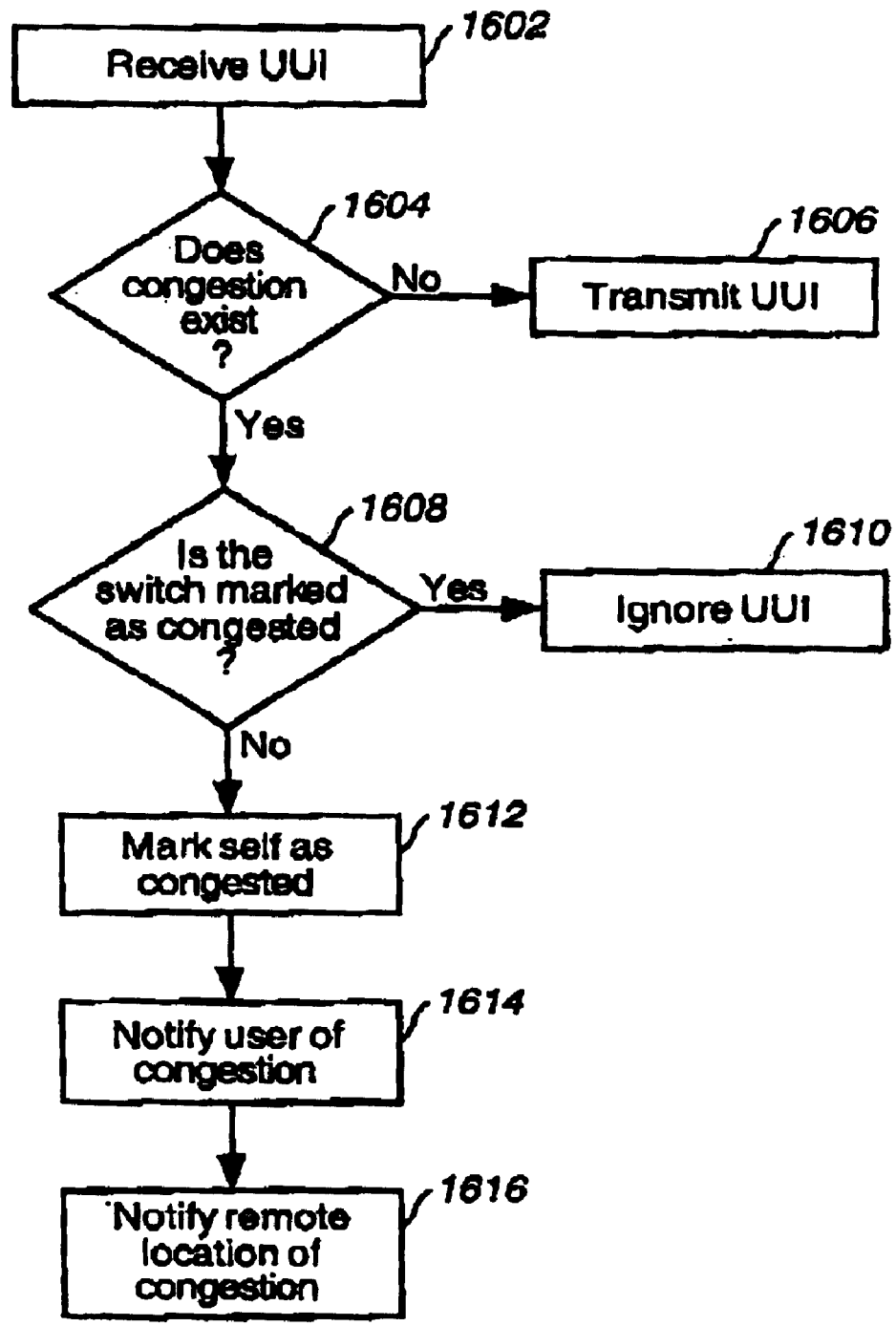
FIG. 16 illustrates the steps performed by a switch upon becoming congested.

Network congestion is indicated by a switch or other network element preferably only when the near end or the far end of a temporary signal connection attempts to transfer a user-to-user information messages as depicted, for example, in FIGS. 15 and 16. In which case, the user initiating the transfer will be notified of the congestion, and preferably the non-initiating user will also be notified. The switch will respond to the first discarded message with a congestion control message including a congestion level information element indicating "receiver not ready." The congestion control message will also include a cause 43, "access information discarded." In one aspect of the invention, each switch preferably will only flow control the user-to-user information messages sent by the near end, i.e., the user directly connected to that switch.

The switch without giving any indication to the sending user will discard subsequently received user-to-user information messages. The network preferably assumes no responsibility for recovery of lost messages. It is preferred that the end-users are responsible to recover from the loss of user-to-user information messages; however in an alternative embodiment, the switches may be modified to store discarded user-to-user information messages until such time as those messages can be transmitted.

When flow control restrictions are removed, i.e., timer TUUS expires, a congestion control message indicating "receiver ready" is sent to the user. If no user information has been discarded no indication will need to be sent, because the congestion control message has not been sent and the other switch(es) and users will have no knowledge of the activation of the flow control restrictions.

The switch, upon receiving a user-to-user information message or an ISUP USR message from the user at its end in step 1602, determines whether congestion exists in step 1604 based on whether N equals zero. If N equals zero, then in step 1606, the user-to-user information message is transferred. Otherwise in step 1608, the switch determines whether the user has been notified based on whether the switch is marked congested. If the switch is marked as congested, then the switch will ignore the user-to-user information message in step 1610. Otherwise, in step 1612, the switch will mark itself as congested; in step 1614, the switch will send a congestion control message to the user; and, in step 1616, the switch will send an ISUP CPG message towards the other switch. One of ordinary skill in the art will appreciate that steps 1612 through 1616 may be performed in any order with respect to each other. Also, one of ordinary skill in the art will realize that marking the switch as congested if done in software preferably will be accomplished as a Boolean value.

Figure 17:
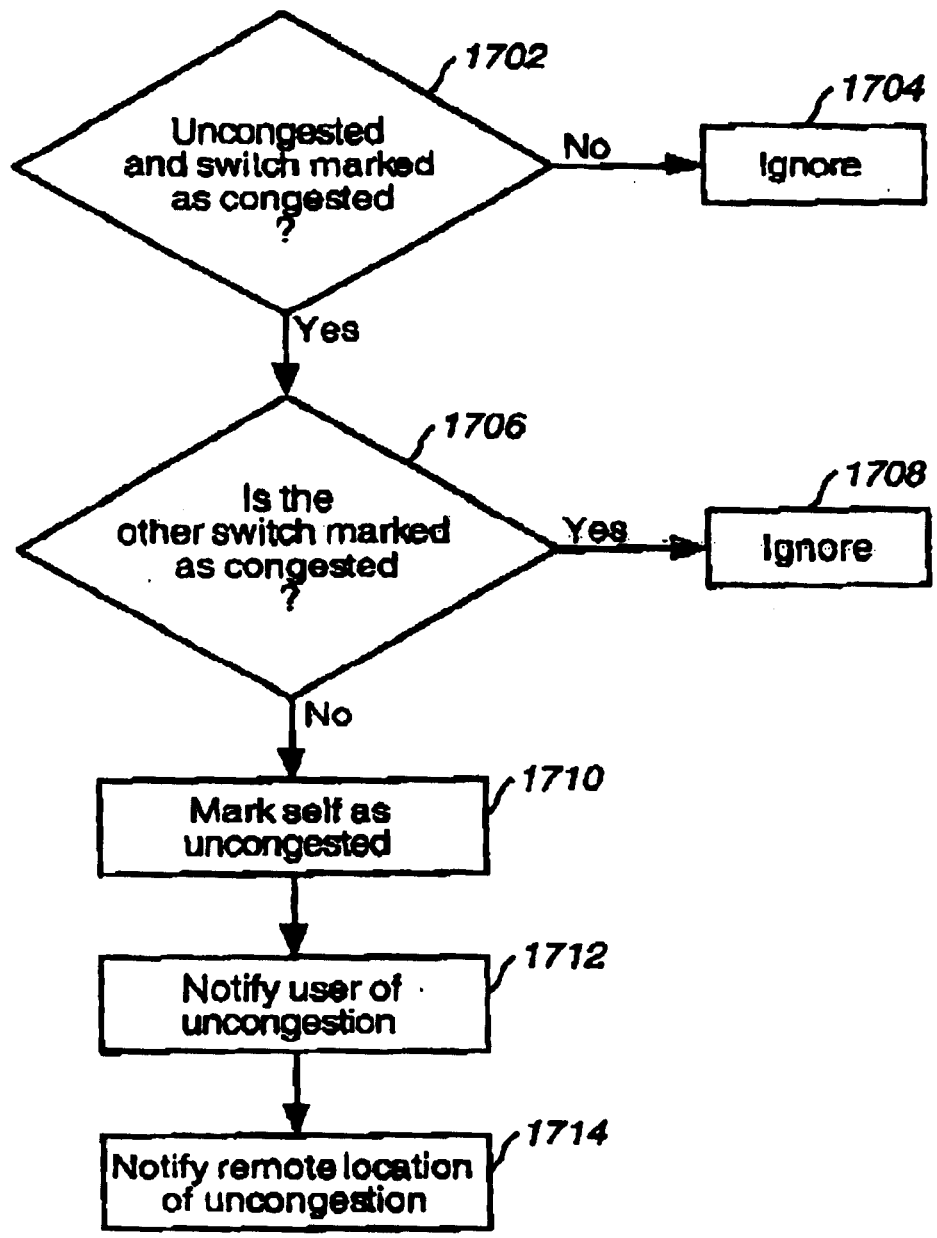
FIG. 17 depicts the steps performed by a switch when it becomes uncongested.

FIG. 17 illustrates the processing steps that occur when the switch becomes uncongested, i.e., N is greater than zero. In step 1702, a determination is made whether the switch is uncongested and has been marked congested. If the determination is no, based on at least one of the conditions being false, then in step 1704, the switch does nothing. If the determination is yes, then in step 1706, a second determination is made whether the other switch is marked as congested. If the answer is yes, then the switch does nothing in step 1708. Otherwise in step 1710, the switch changes its state from congested to uncongested. In step 1712, the switch notifies the user that it is ready to receive user-to-user information messages, for example, by sending a message stating "receiver ready." In step 1714, the switch notifies the other switch that it is ready to receive ISUP USR messages. One of ordinary skill in the art will appreciate that steps 1710 through 1714 may be performed in any order with respect to each other.

Figure 18:
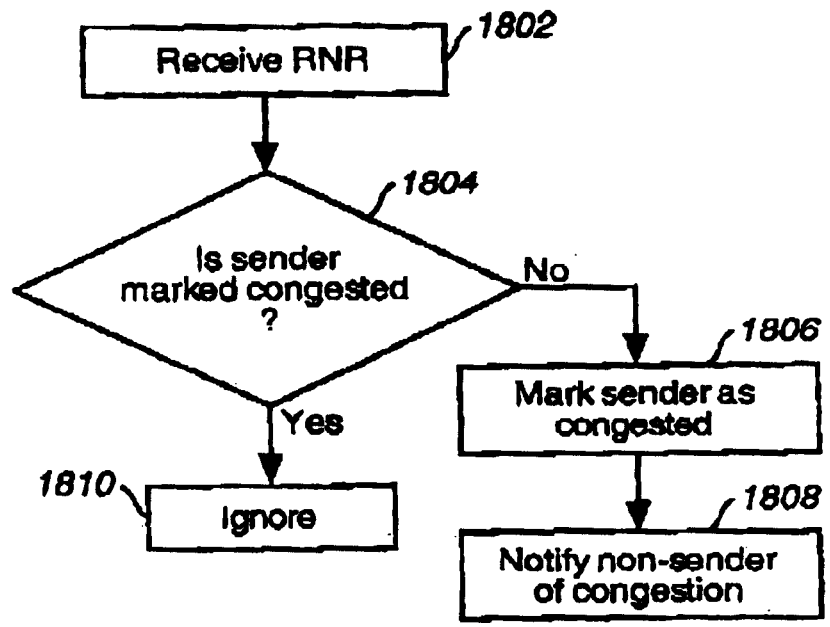
FIG. 18 illustrates the processing that occurs at a switch upon receiving notice of congestion at another switch or a user.

The processing that occurs at the switch when the other switch becomes congested and notifies the switch is shown in FIG. 18. First in steps 1802 through 1806, if an ISUP CPG message with "receiver not ready" is received from the other switch, which for this scenario is the sender in FIG. 18, and the other switch is not marked as congested (far-end congestion state), then the other switch is marked as congested. Next, if the switch was not marked as congested, a congestion control message that the "receiver not ready" is sent to the user, which for this scenario is the non-sender in FIG. 18, in step 1808. In steps 1804 and 1810, if the other switch is already marked as congested, then ignore the latest message from the other switch.

Figure 19:
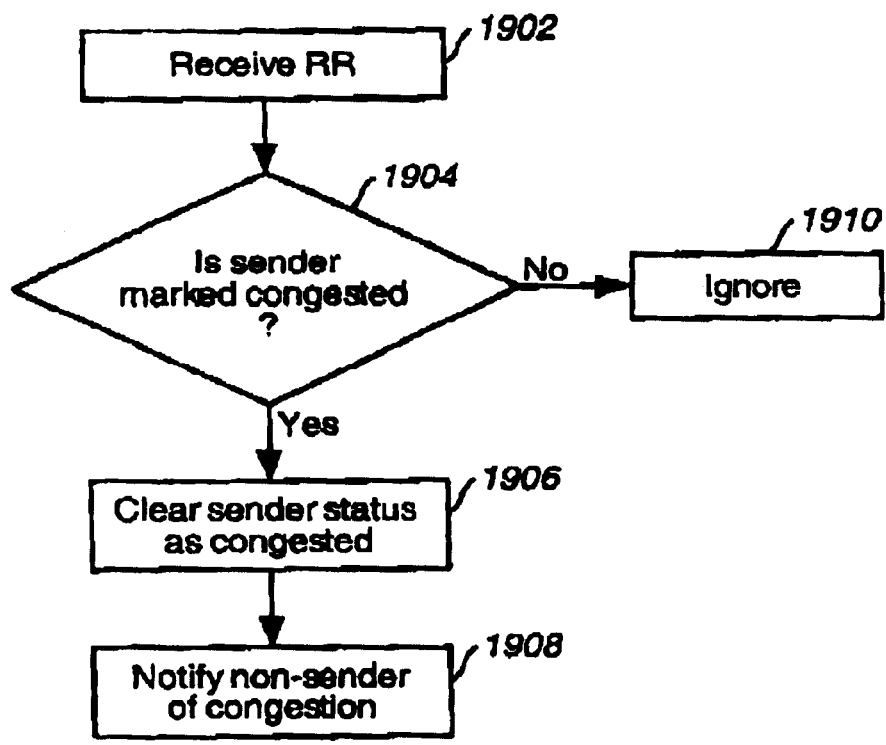
FIG. 19 depicts the processing that occurs at a switch upon receiving notice from another switch or a user that it has become uncongested.

In steps 1902 through 1906, when an ISUP CPG message indicating no congestion is received from the other switch, which for this scenario is the sender in FIG. 19, and the other switch is marked as congested, then the switch clears the congested state set for the other switch (far-end congestion state). In step 1908, the switch also sends a congestion control message "receiver ready" to the user, which for this scenario is the non-sender in FIG. 19. Otherwise, in steps 1904 and 1910, the switch will ignore the ISUP CPG message.

Figure 20:
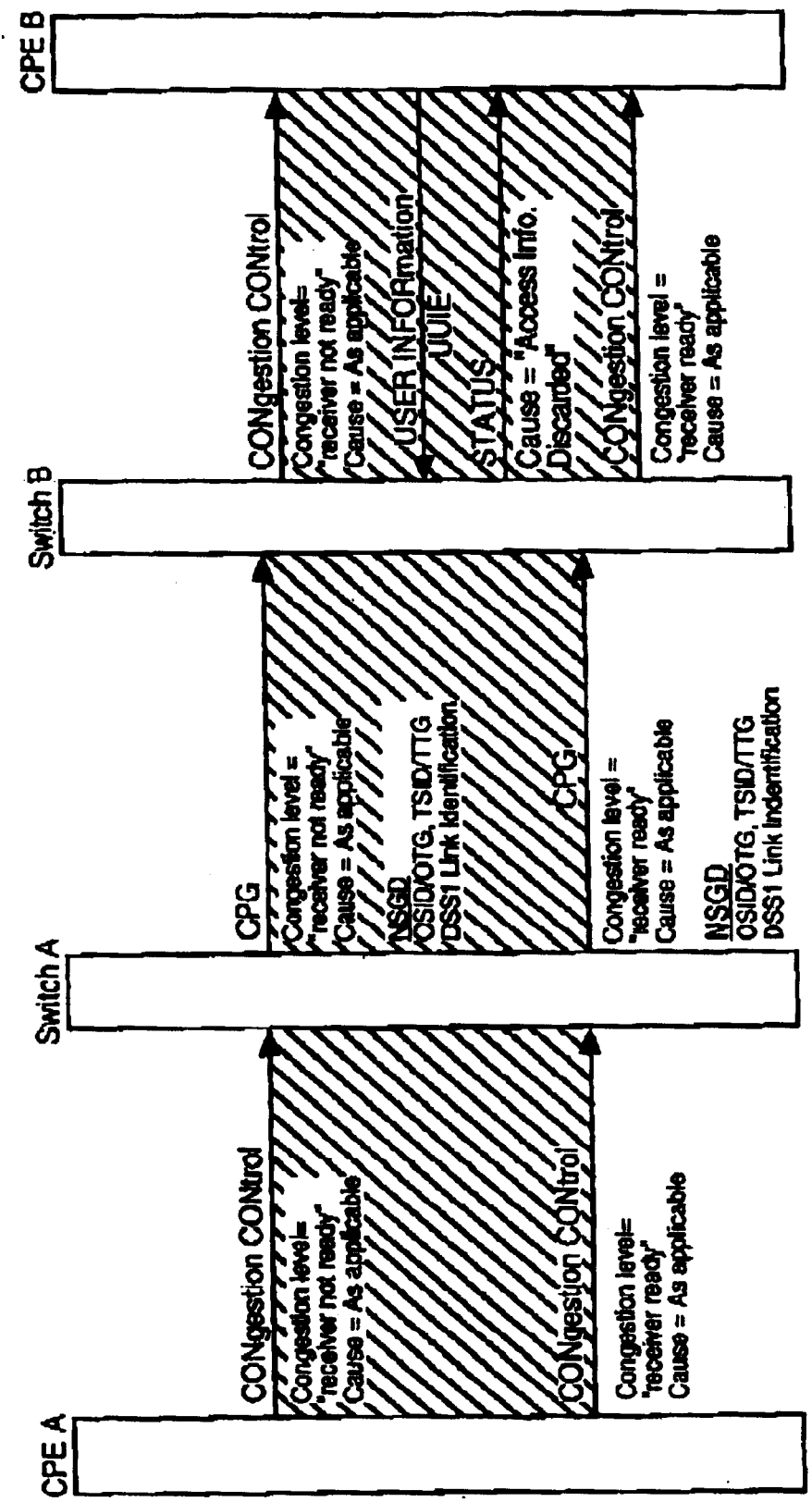
FIG. 20 illustrates a flow diagram for when a user's interface becomes congested.

The user (CPE A as shown in FIG. 20) can also send congestion control messages to shut off the flow of user-to-user information messages from the network 102. In this event the network preferably will inform the far end user (CPE B) by sending a congestion control message as shown in FIG. 18. The network probably will discard any user-to-user information messages received from the remote user (CPE B) until notified in a congestion control message "receiver ready" from CPE A.

The processing that occurs at the switch when the other switch is congested also occurs when the user connected to the switch becomes congested and notifies the switch. First in steps 1802 through 1806, if a congestion control message with "receiver not ready" is received from the user, which for this scenario is the sender in FIG. 18, and the user is not marked as congested, then the user is marked as congested. Next in step 1808, if the user's state is changed to congested in the first step, then an ISUP CPG message that the "receiver not ready" is sent to the other switch, which for this scenario is the non-sender in FIG. 18. In steps 1804 and 1806, if the user is already marked as congested, then the switch ignores the latest message from the user.

When a congestion control message indicating "receiver ready" is received from the user, which for this scenario is the sender in FIG. 19, and the user is marked as congested in steps 1902 and 1904, the switch clears the congested state set for the user in step 1906 and sends an ISUP CPG message of "receiver ready" to the other switch, which for this scenario is the non-sender in FIG. 19, in step 1908. In steps 1904 and 1910, if the switch was not marked as congested, then the switch sends an ISUP CPG message indicating "receiver ready" to the other switch.

The user's interface (CPE A in FIG. 20) performs similar processing to that of the switch when the switch is congested. First, if the user is not marked congested, then the user's interface marks the user as congested and sends a congestion control message to the switch indicating "receiver not ready." If the user is already marked as congested, then the user's interface will ignore the message. The reverse of this occurs when the user's interface becomes uncongested. Specifically, the user congested state is cleared and a congestion control message is sent to the switch indicating that "receiver ready."

The user or the network can resume the flow of user-to-user information by sending a congestion control message indication "receiver ready." This should only be done by the entity that sent the congestion control message that initiated flow control.

Preferably, a congestion control message with the global call reference value will be interpreted as a message with an invalid call reference value.

In the preferred embodiment, network 102 assumes no responsibility for recovery of loss messages. In this embodiment, it is the responsibility of the end users to recover the loss of user-to-user information messages as a result of congestion. In an alternative embodiment, network 102 is provided the capability to recover loss messages or messages otherwise not transferred due to congestion, for example, by storing these messages in memory at a switch.

f. Clearing a Temporary Signaling Connection

Figure 21:
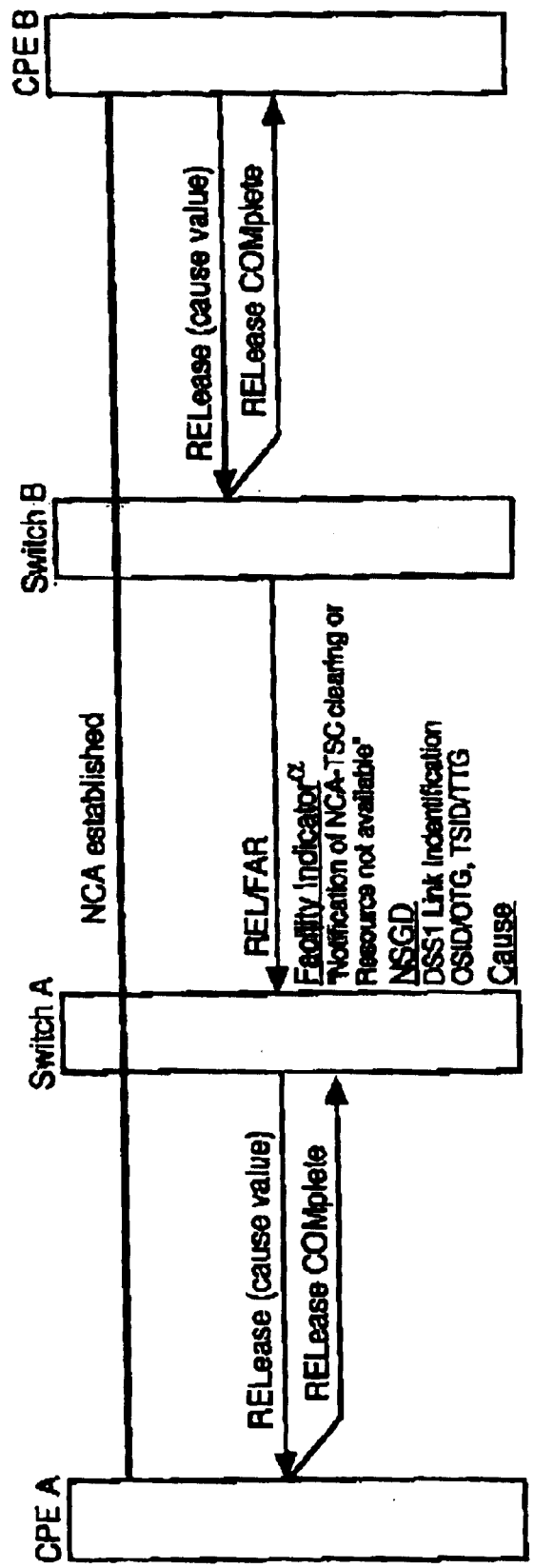
FIG. 21 depicts a flow diagram representing the clearing of a non-call associated temporary signaling connection.

Either user can clear an active temporary signal connection by sending a release message as shown, for example, in FIGS. 8 and 11. If the user sends a disconnect message anyway, the non-call associated temporary signal connection will be cleared. For example, FIGS. 8 and 21 show CPE B initiating the clearing of the connection. Switch B responds with a release complete message. A disconnect message is not used since there is no B-channel to disconnect between the user (CPE B) and the switch (Switch B).

Referring to FIGS. 22–25, Switch B upon receiving the release message from CPE B will determine if this is the only active temporary signal connection with Switch A in steps 2302 and 2304. If it is the last temporary signal connection, then an ISUP release message is sent towards Switch A and existing ISUP procedures are used to clear the signaling path and the IMT (voice) path in step 2306. In step 2308, the database located at each switch is updated. One of ordinary skill in the art will appreciate that the databases can be updated at anytime after the relevant switch learns of the request, and another order of updating the databases is represented by steps 2312 and 2318. In step 2310, the signaling connection (remote connection) between the second switch and non-requesting user is released.

If it is not the last temporary signal connection between the two switches, then Switch B will send an ISUP FAR message towards Switch A with the facility indicator set to "notification of non-call associated temporary signal connection clearing" or "resource not available" in step 2314. The cause value received from the CPE B will propagate end to end via the ISUP FAR/release message in steps 2310 and 2316. The database at Switch A and the database at Switch B are updated to reflect the temporary signal connection clearing and/or release in step 2308, 2312, and 2318.

Figure 22:
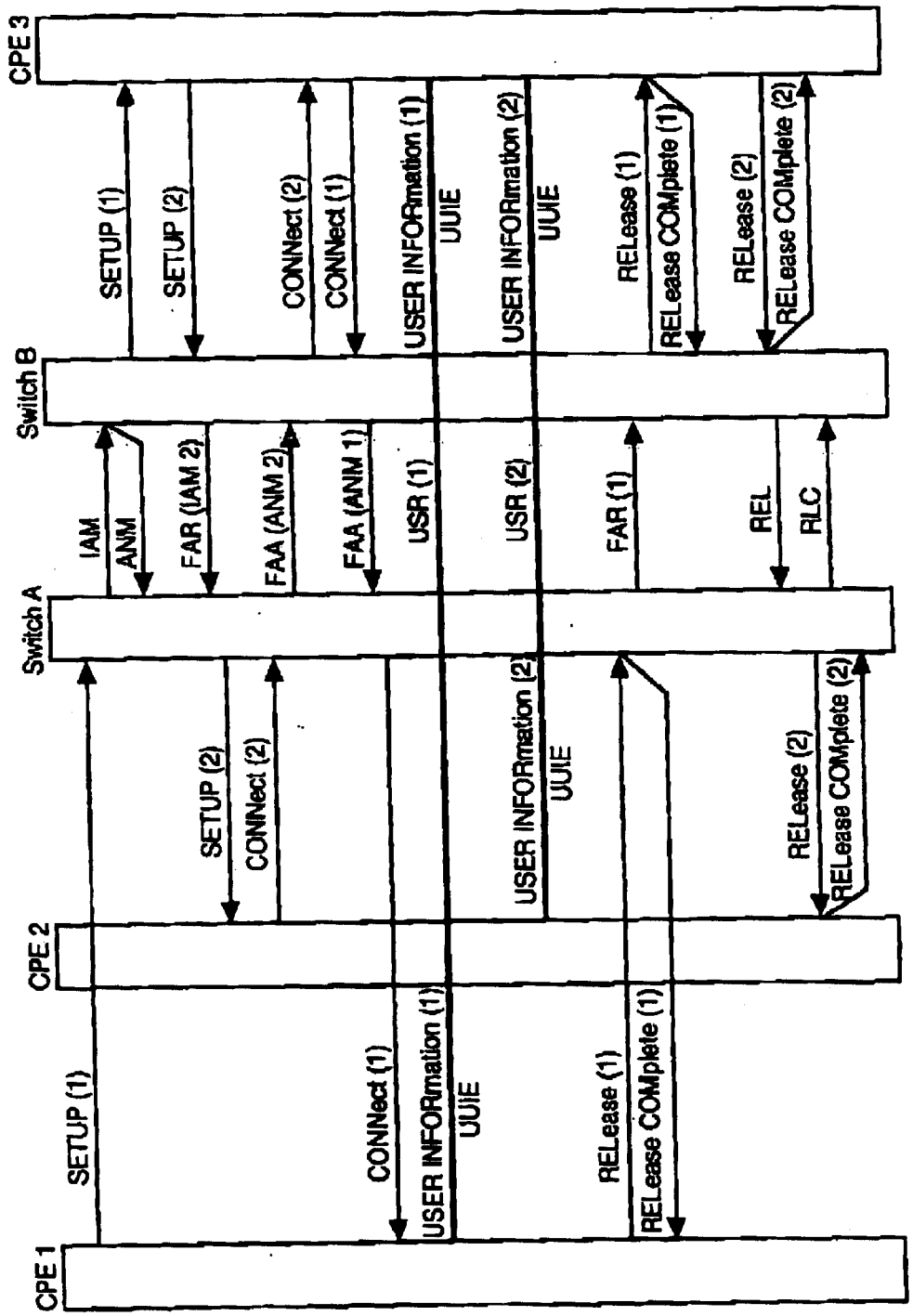
FIG. 22 illustrates a flow diagram depicting multiple non-call associated temporary signaling connections between two switches.
Figure 24:
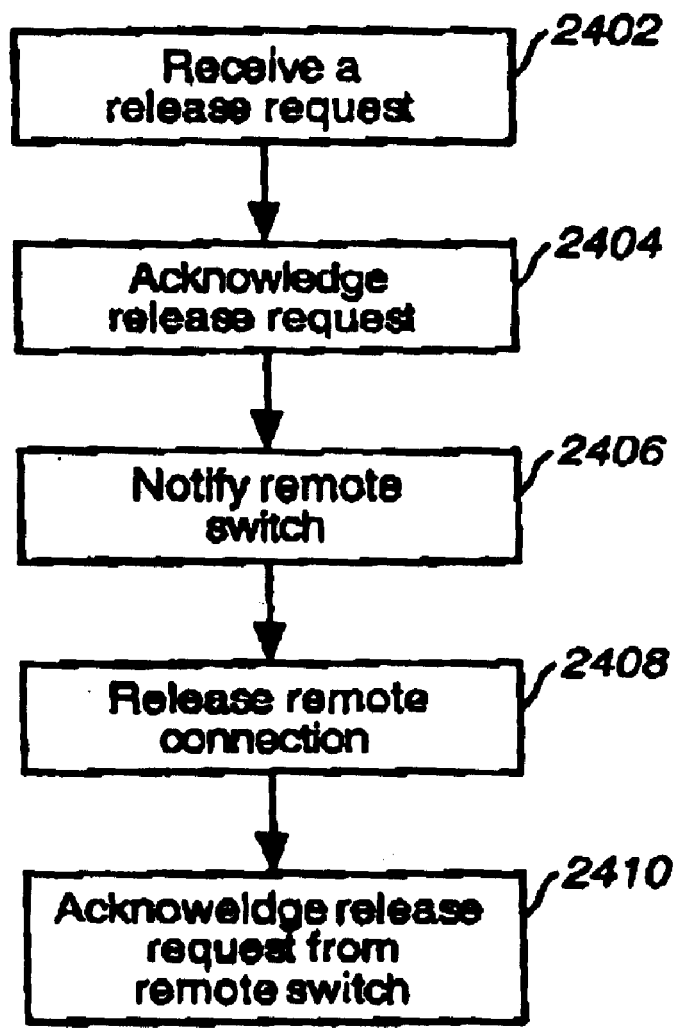
FIG. 24 illustrates an alternative series of steps for releasing a connection that may be merged with the steps shown in FIG. 23.

FIGS. 22 and 24 illustrate an alternative embodiment where acknowledgment is provided for a requested release by transmitting, for example, a release complete message. In step 2402, a switch receives a release request from a user. The switch acknowledges this request in step 2404 and releases the connection to the user. The switch then notifies the other (remote) switch of the release request in step 2406. These last two steps may be performed in reverse order. The other switch releases the remote connection in step 2408 and acknowledges the release request in step 2410, which may be reordered with step 2408.

If a disconnect message initiates the normal call clearing procedures, then both the IMT path and the signaling path are cleared between the switches 104 and 108. Alternatively, if a disconnect message is sent by a user, the network 102 may treat it as a release request if other connections are using the same connection paths.

The network 102 preferably will send a release message or a release complete message with a cause value of 29, "facility rejected," to customer premises equipment requesting a signaling connection once the maximum limit on the number of messages sent and received by a switch for a given temporary signal connection has been exceeded. This is accomplished by setting a parameter or counter at each switch to limit the number of user-to-user information elements delivered per call.

A second timer preferably is started at every switch (originating, terminating and tandem) in the non-call associated temporary signal connection path once the connection is established. Upon the second timer expiry the switch will release the non-call associated temporary signal connection resources and invoke the procedures to clear the non-call associated temporary signal connection. The timer preferably will have a range of 0 to 1,440 minutes.

g. Successive Temporary Signaling Connections

Figure 25:
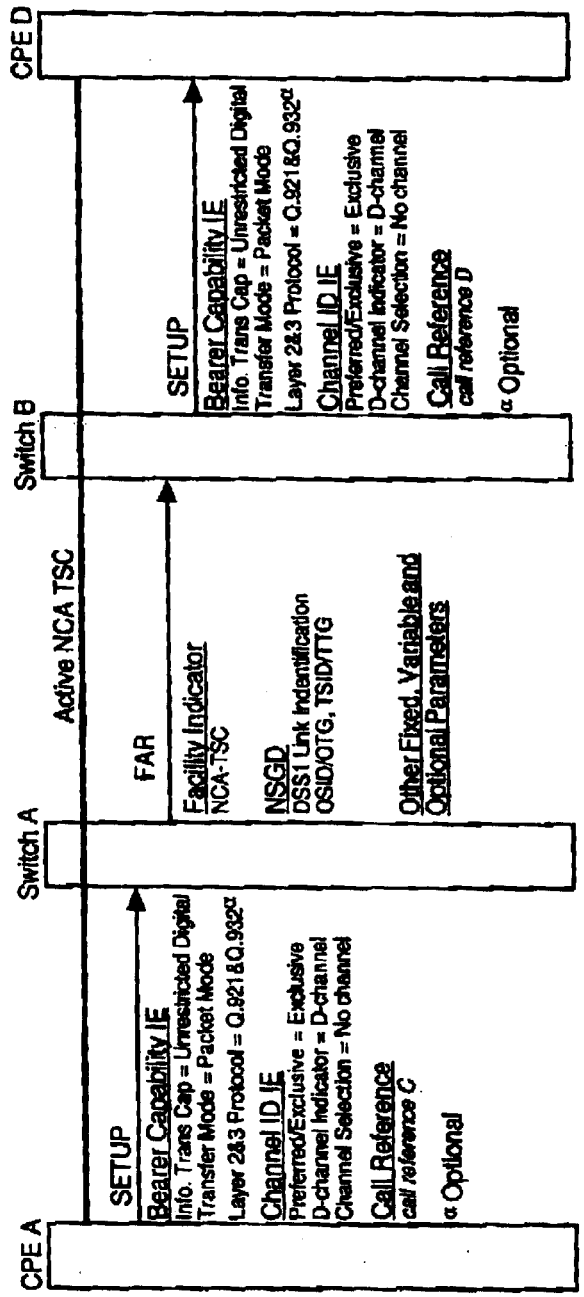
FIG. 25 depicts a flow diagram showing the establishment of a successive non-call associated temporary signaling connection.

Referring to FIGS. 10 and 22, after one non-call associated temporary signal connection has been established between two switches as illustrated by setup(1), where the number in the parenthetical comment indicates the particular non-call associated temporary signal connection a message is associated with, between CPE 1 and CPE 3 in FIG. 22, a second temporary signaling connection may use the same path as illustrated by step 1040. When a second temporary signal connection is requested by the same customer premise equipment or another customer premise equipment that will connect the two same switches, the first temporary signal connection path will be utilized. The second connection for a particular connection path is preferably requested at anytime while the first connection is being used as illustrated in FIG. 25 by CPE C and CPE D, otherwise a new temporary signal connection path will need to be established. The second connection may occur over either the signaling network or through the voice path created upon initiation of the first non-call associated temporary signal connection.

Switch B, upon receiving a setup(2) message from CPE 3 requesting a non-call associated temporary signal connection with CPE 2 as shown in FIG. 22, will perform existing call processing. If interworking is required, then before selecting an outgoing ISUP circuit by contacting the data access point 140 and formulating an initial address message, the originating switch will query the database to determine if there is an existing active temporary signaling connection to the terminating switch, which in FIG. 22 is Switch A and in FIG. 10 involves steps 1004 and 1040. Alternatively, the data access point 140 will provide terminating switch identification (TSID), terminating trunk group (TTG), and subsequent address information to Switch B depending on the switch database contents.

Figure 26:
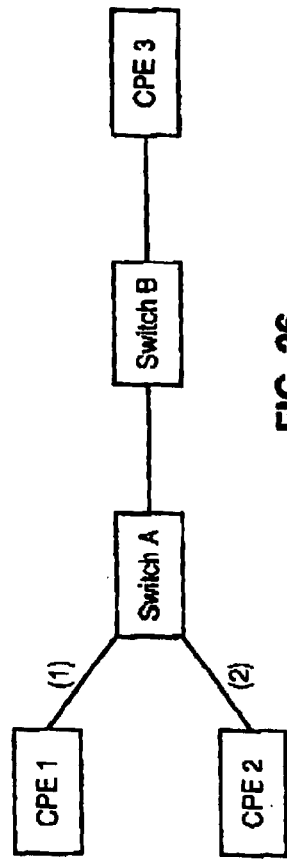
FIG. 26 illustrates a block diagram structure showing the interrelationships between the network components participating in the temporary signaling connections depicted in FIG. 22.

If there already is an active temporary signaling connection between the two switches then an ISUP FAR message is sent over the existing ISUP circuit identification code path to indicate the request for this non-call associated temporary signal connection. In the example illustrated in FIG. 22, there is a prior connection between Switch A and Switch B as indicated by the setup(1) messages flowing from CPE 1 via the switches to CPE 3. The functional structure of the interconnections is shown in FIG. 26.

The possible parameter contents of outgoing ISUP FAR message may include one or more of the following: a facility indicator (indicating non-call associated temporary signal connection), a network-specific generic digits, a business group, a called party number, a calling party number, a charge number, a user-to-user information, a generic address, generic digits, and an access transport. The network-specific generic digits parameter preferably includes at least one of the following: terminating switch identification (TSID), a terminating trunk Group (TTG), an originating switch identification (OSID), an originating trunk group (OTG), and a DSS1 link identification such as call reference C in this example.

In step 1044, Switch A, upon receiving the ISUP FAR message indicating a request for a temporary signaling connection, will send a setup message to the called user (CPE 2) with information elements encoded as discussed previously. In steps 1042 and 1046, the respective databases are updated. Steps 1040 through 1046 may be performed in any order as long as step 1044 occurs after step 1040.

Figure 23:
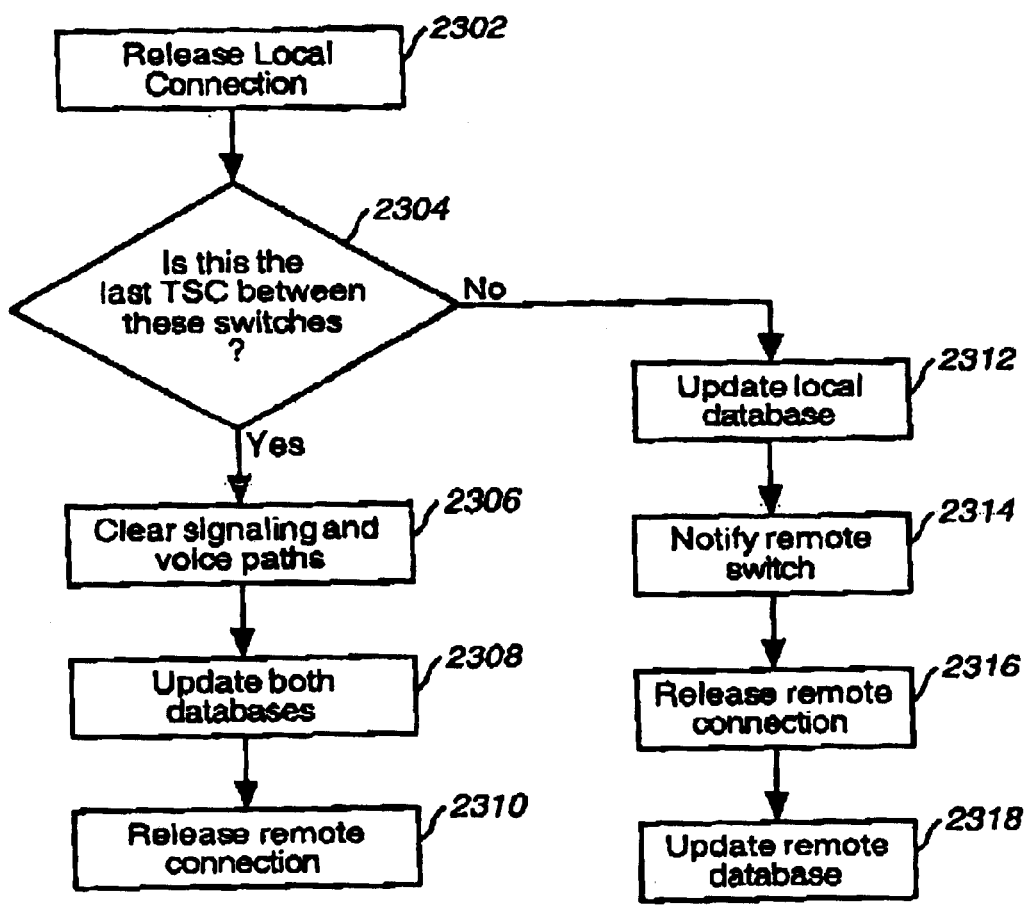
FIG. 23 depicts the steps for releasing a connection.

The procedure previously discussed above in connection with establishing a temporary signaling connection apply for establishing non-call associated temporary signal connection acknowledgment and user information transport. The clearing of the temporary signal connection is slightly modified from the clearing procedure previously discussed in that the IMT path and the signaling path between the switches are not cleared unless the temporary signal connection being cleared is the last one as illustrated by the clearing of CPE 2 and CPE 3 in FIG. 22. Referring to FIGS. 22 and 23, when CPE 1 releases the temporary signal connection path, a ISUP FAR message is sent from Switch A to Switch B notifying Switch B that the first temporary signal connection is to be cleared.

In an alternative embodiment, a counter will be maintained at each switch (originating, terminating and tandem) to limit the number of simultaneous temporary signal connection invocations. Once this limit is reached on the switch. The switch will reject any additional temporary signal connection requests until capacity becomes available. The cause value sent in the appropriate refusing message would be 29, "facility rejected." In accordance with a further embodiment, when the limit is reached, another connection path is created to accommodate the additional temporary signaling connection requests as illustrated by step 1020.

In yet another embodiment, a trunk group/PRA level counter may be maintained to limit the number of simultaneous temporary signaling connections allowed per ISDN primary rate interface. The default value will depend upon the hardware limitations on the switch platform.

h. Abnormal Situations

Figure 27:
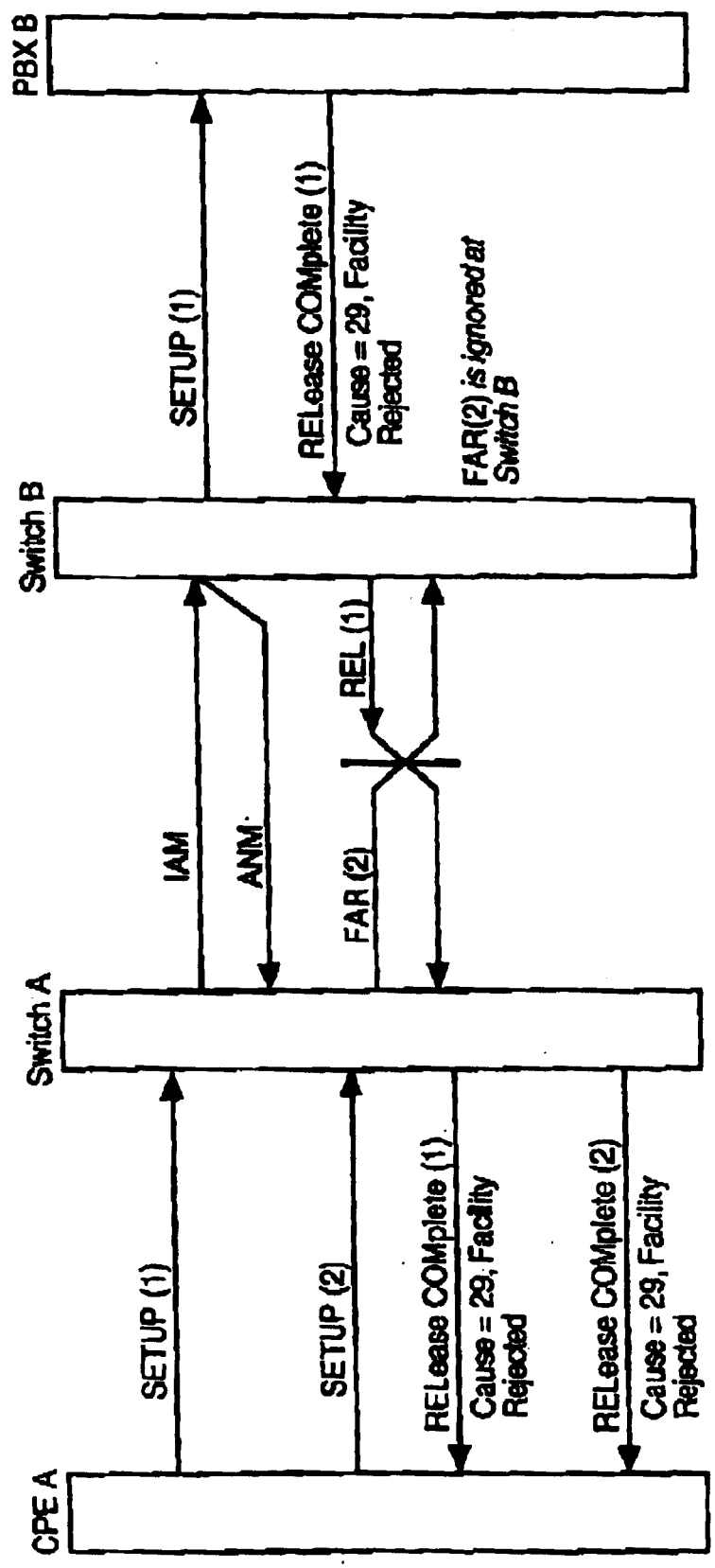
FIG. 27 depicts a flow diagram for when two temporary signaling connections are rejected in an abnormal condition state.

FIG. 27 illustrates the situation where CPE A sends a setup(1) message requesting a non-call associated temporary signal connection with CPE B. CPE B responds by rejecting the request for non-call associated temporary signal connection by sending a release complete(1) message with cause 29, "facility rejected." Switch B then sends a release message (REL(1)) towards Switch A. In the meantime, CPE A requests another non-call associated temporary signal connection with CPE B as indicated by setup(2). Switch A sends a ISUP FAR(2) message towards Switch B, which crosses in the network with the release message (REL(1)) sent by Switch B towards Switch A. Switch A will initiate non-call associated temporary signal connection clearing on call references 1 and 2 (as determined by the parenthetical numbers) by sending a release complete message for each call to CPE A after receiving the release message from Switch B. Switch B will ignore the ISUP FAR(2) message received after it has sent the release message.

In case of a glare scenario, where CPE A tries to set up a non-call associated temporary signal connection with CPE B and at the same time CPE B tries to set up another non-call associated temporary signal connection with CPE A, there is possibility that two non-call associated temporary signal connection paths may be set up between Switch A and Switch B.

If an initial address message is received on an ISUP circuit that is already involved in a non-call associated temporary signal connection, then the initial address message will be ignored. If an ISUP reset circuit message (RSC) is received on a circuit involved in a non-call associated temporary signal connection, then all non-call associated temporary signal connections associated with the circuit would be cleared preferably with proper notifications being sent to the end users. The reset circuit message preferably will be manually sent by a technician monitoring the network to clear connection paths that have bogged down and/or jammed up.

i. Other Types of Connections

Other types of connections may be made besides non-call associated temporary signal connections using an established temporary signal connection path, because a voice path is created to allow the use of the signaling network to transport the data/information being transferred through the non-call associated temporary signal connection. Examples are voice calls, call associated temporary signaling connection, or message associated user-to-user services. A non-call associated temporary signal connection may use the signaling network connection path established when a prior voice call, which is still active, is placed. In this alternative embodiment, the database illustrated in Table 1 will also maintain information relating to these types of connections when they are established between two switches.

Preferably when the user-to-user service is implemented as a message associated user-to-user service it is similar to the user-to-user signaling type 1 service as defined by ANSI T1.621-1922. Usually, the calling party can only request this service. When information is exchanged according to the message associated user-to-user service, user-to-user information is exchanged within setup, alerting, connect and/or disconnect call control messages. Message associated user-to-user information can also be included in the first expected clearing message such as a release message or release complete message. Preferably, up to 128 octets of user-to-user information can be transferred in each message.

In a scenario where both users disconnect simultaneously, or nearly simultaneously, delivery of message associated user-to-user information in a clearing message is not guaranteed. Preferably, network 102, and in particular overlay network 304, will not pass message associated user-to-user information in a disconnect message when it is sent prior to the call being in the active state.

In addition to the user-to-user information element, network 102 may handle additional data elements such as user data information such as called party subaddress, calling party subaddress, high layer compatibility, low layer compatibility, redirecting number, locking shift to codeset 6 and codeset 6 information elements, and locking shift to codeset 7 and codeset 7 information elements.

In an alternative embodiment where message associated user-to-user information transfer is supported in association with a circuit-switched connection, the support of message associated user-to-user information depends on the availability of resources in the signaling network 112. Thus, if, for example, the originating user 122A desires a message associated user-to-user information to be transferred in the setup, alerting, and/or disconnect messages, but has no message associated user-to-user information to send in the setup message, the originating user 122A places a user-to-user information element in the setup message with a length equal to 1.

Although the service can be implemented in a scalable fashion to handle different data rates and volumes, preferably the total length of the information elements satisfies the following criteria: 1) length of the user-to-user information element is from three to 131 octets; 2) the total length of all user data information elements will not exceed 129 octets; and 3) combined length of the user-to-user information element and the user data information element will not exceed 198 octets.

If the size of the information elements is limited, then an element with an invalid length will be dropped and status information provided to one or both users. If desired, the system can be setup to provide verification of receipt of individual user data information elements.

Figure 28:
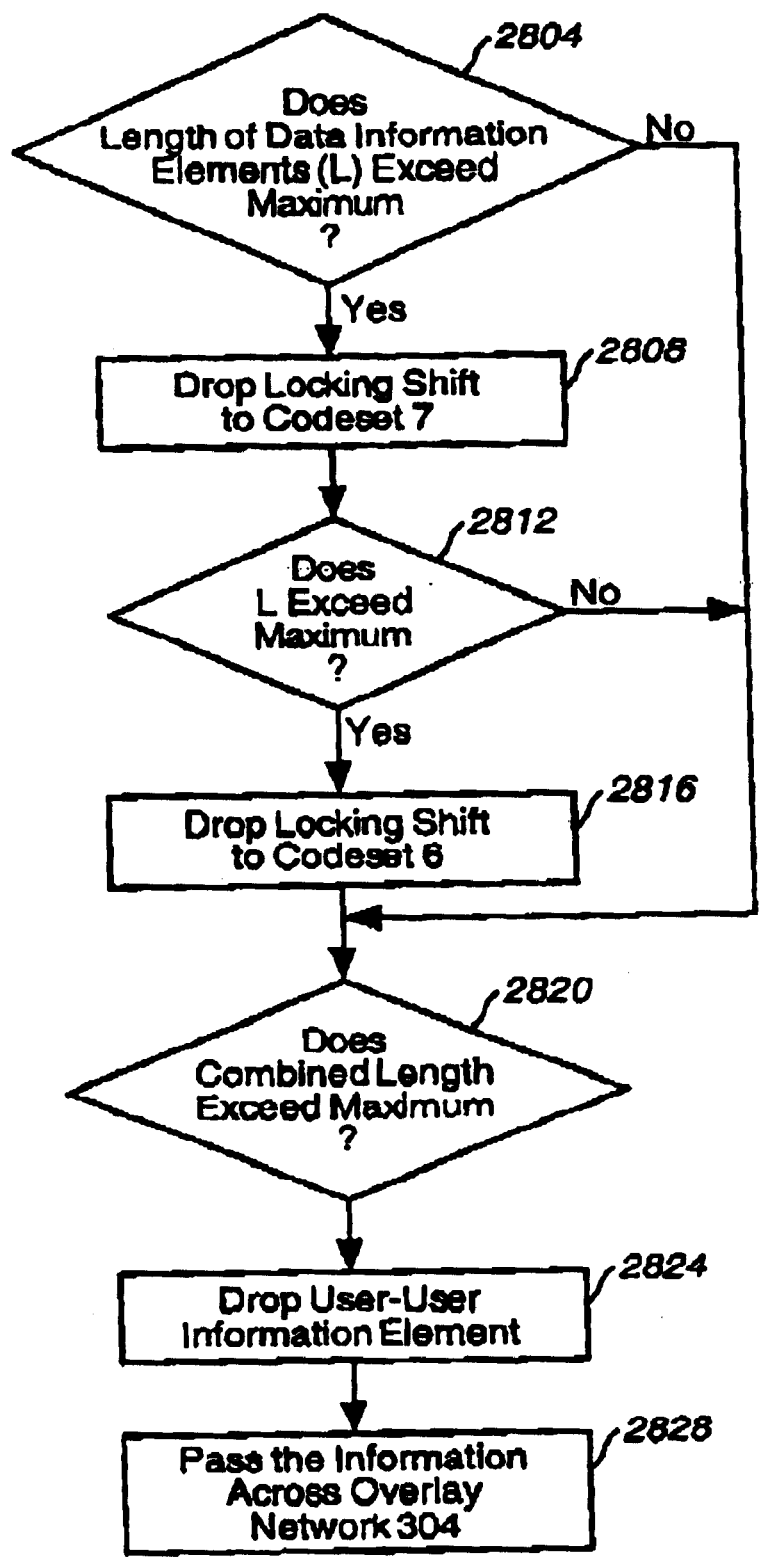
FIG. 28 depicts an operational flow diagram illustrating a process for determining whether a length of data information elements exceeds a maximum length constraint.

FIG. 28 is an operational flow diagram illustrating one example of a process for determining whether any information elements need to be dropped. This process is described by way of example only.

Referring now to step 2804 in FIG. 28, it is first determined whether the length of the user data information elements except for user-to-user information elements exceeds the maximum number of octets. If the length of all the user data information elements not including the length of the user-to-user information elements does exceed this maximum, the locking shift is dropped to code set 7 and the code set 7 information element as illustrated by step 2808.

In step 2812, the system again determines whether the length of all of the user data information elements not including the length of the user-to-user information elements exceeds the maximum number as illustrated by step 2812. If this length does exceed the maximum, the locking shift is dropped to code set 6 and the code set 6 information element as illustrated by step 2816.

Where the length of all the user data information elements not including the length of the user-to-user information elements does not exceed the maximum number of octets as illustrated in steps 2804 and 2812 or after the locking shift has been dropped to code set 6 as indicated by step 2816, it is determined whether the length of all of the user data information elements plus the length of the user-to-user information elements exceeds the maximum combined length as illustrated by step 2820.

If the maximum combined length is exceeded, the user-to-user information elements are dropped in step 2824 and the user data information elements are passed across network 102 in step 2828. If, on the other hand, the combined length does not exceed the combined maximum in step 2820, the user data information elements along with the user-to-user information elements are passed across network 102 as indicated by step 2828.

In view of the instant disclosure, one of ordinary skill in the art will realize how to implement the invention to perform similar functionality to the last example using other techniques for limiting or otherwise controlling the amount of data transferred should such a feature be desired.

Call associated temporary signaling connections can be requested during or after the call setup request that uses the voice path associated with the non-call associated temporary signal connection. Accordingly, the temporary signaling connection request is handled differently depending on whether it occurs before or after the call setup is complete. If a temporary signaling connection request occurs during call setup, the request is included in the setup message. If, on the other hand, the temporary signaling connection request occurs after the call setup is complete, the temporary signaling connection request is made using the facility message. In both scenarios, according to this embodiment, a binary facility coding value field of a network-specific facilities information element is coded to request a temporary signaling connection.

Accordingly, the manner in which temporary signaling connection requests are handled depends on whether setup is complete and on whether the originating party or the terminating party made the temporary signaling connection request.

Figure 29:
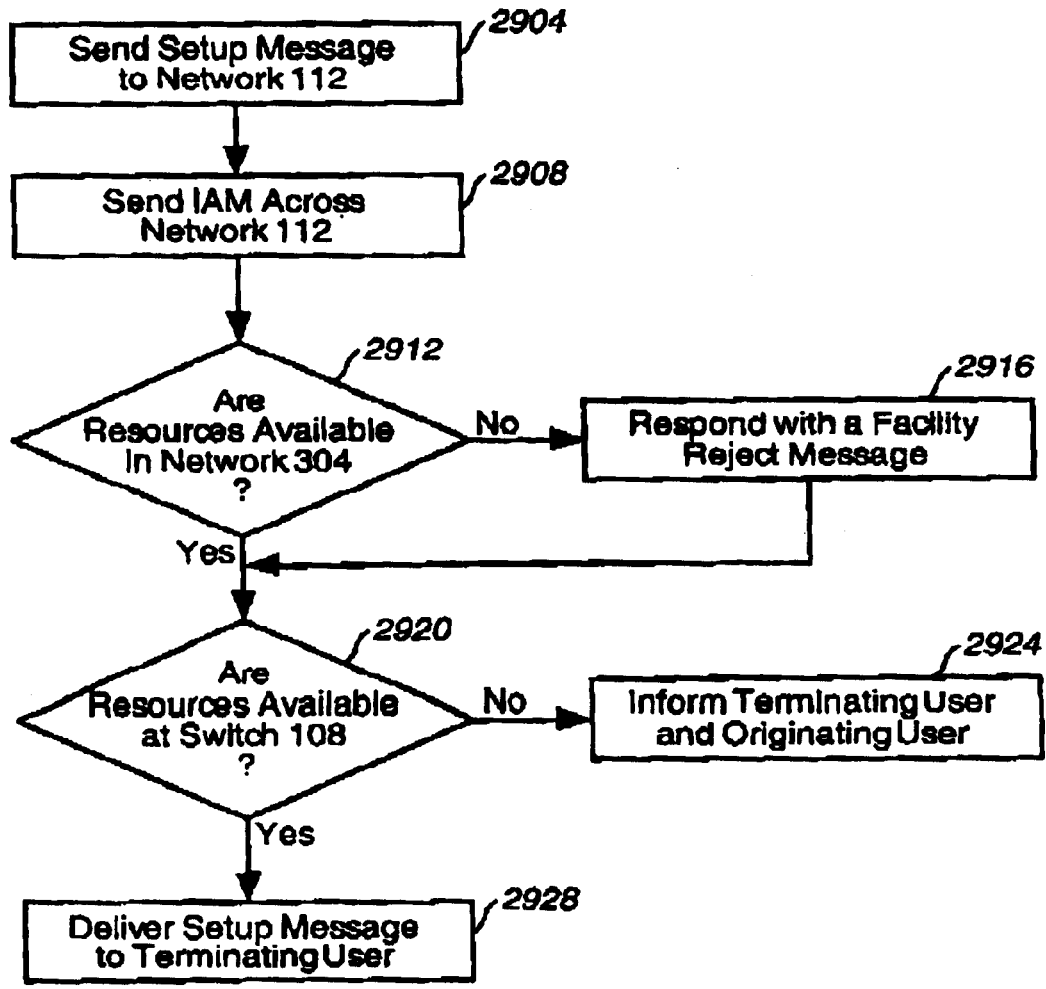
FIG. 29 depicts an operational flow diagram illustrating a process for handling a temporary signaling connection request when the request is made at setup time according to one embodiment of the invention.
Figure 32:
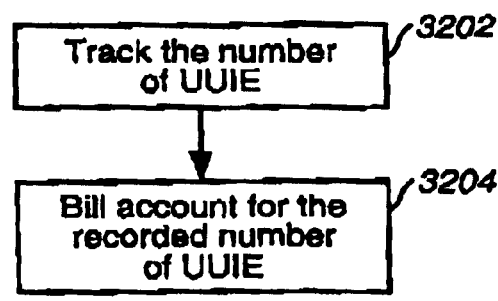
FIG. 32 illustrates the billing process as a flowchart.
Figure 30:
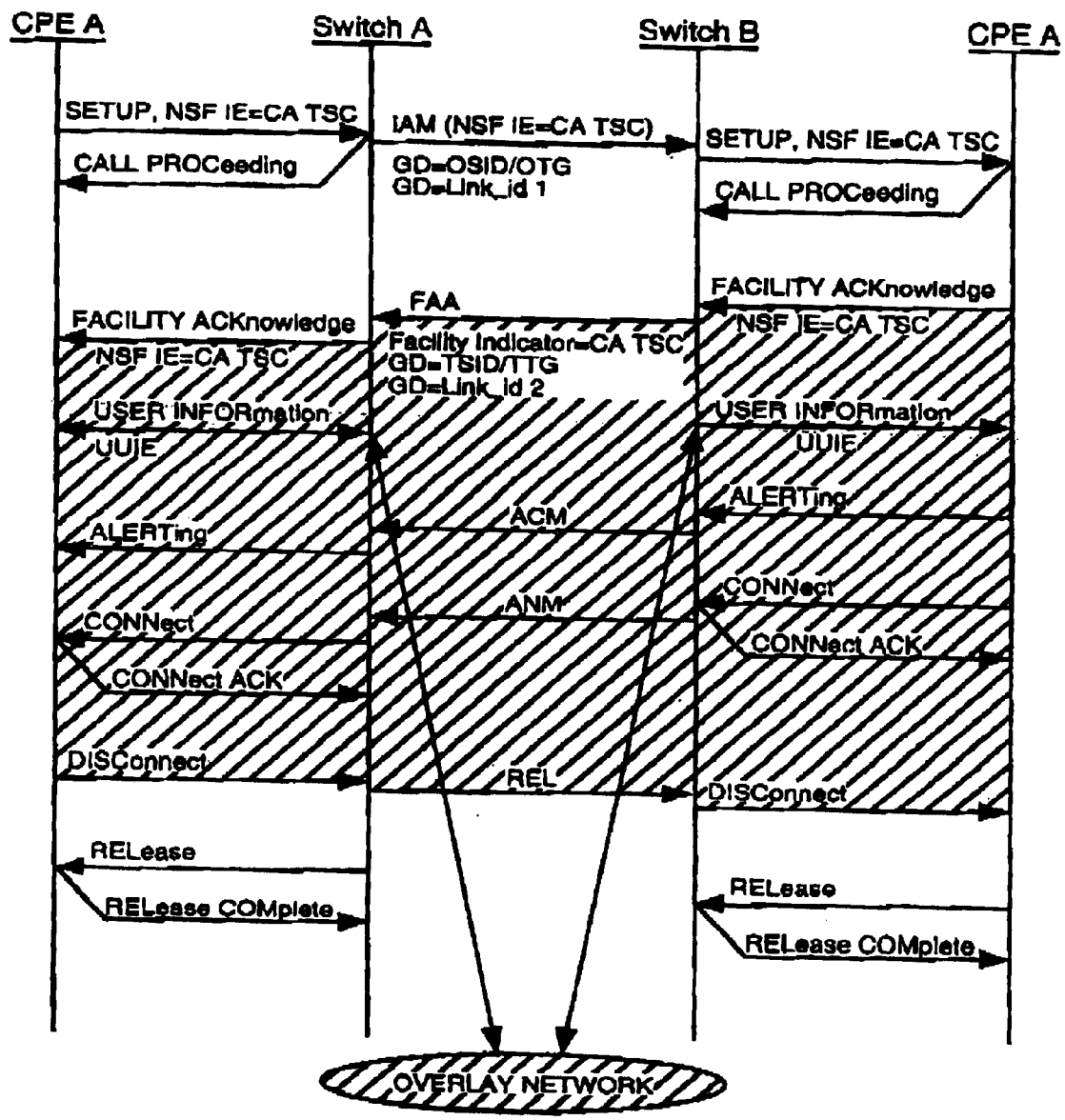
FIG. 30 depicts a call flow diagram illustrating messaging that occurs during the process of handling a call-associated temporary signaling connection at setup time according to one embodiment of the invention.

FIG. 29 is an operational flow diagram illustrating a process by which call associated temporary signaling connections are handled when the temporary signaling connection request is made at setup time for a second connection for a previously established temporary signal connection. FIG. 30 is a call flow diagram illustrating messaging that occurs during the process of handling a call associated temporary signaling connection at setup time. Referring to FIGS. 29 and 30, this process is now described. The temporary signaling connection request is made by the calling party, because this is a temporary signaling connection request at call setup.

In step 2904, the originating party 122A sends a setup message to the network 112. More particularly, the setup message is sent by the originating party (CPE A) to the originating inter-exchange carrier switch 104 (Switch A). This setup message includes the call associated temporary signaling connection request. Preferably, the request sets a network-specific facilities information element to indicate that a call-associated temporary signaling connection is being requested at call setup.

In response to the setup message, an initial address message is sent from originating inter-exchange carrier switch 104 (Switch A) to terminating inter-exchange carrier switch 108 (Switch B) in step 2908. In this example, the request is transmitted by including an OSID/OTG (originating switch identification/originating trunk group) and Link_id as generic digits (GDs) parameters in the initial address message.

If resources are not available within network 102, network 102 rejects the call associated temporary signaling connection request. This is accomplished by sending a facility reject message (not illustrated in FIG. 30) to the originating party 122A as illustrated by steps 2912 and 2916.

This facility reject message can include an indication of a cause of the rejection by sending, for example, a cause information element. Additionally, network 102 may respond with a message indicating that the call is proceeding. This is accomplished by sending a call proceeding message to the originating user 122A.

If resources to handle the temporary signaling connection request are not available at terminating inter-exchange carrier switch 108, network 102 sends a message to the terminating user 122B indicating such availability. This message is a setup message that includes an indication that temporary signaling connection resources are not available. This is accomplished by inserting a code point in the binary facility coding value field of the network-specific facilities information element. Additionally, a similar notification preferably is sent to the originating user 122A, and this notification is accomplished by sending a facility reject message. This notification is depicted as steps 2920 and 2924.

If resources are available, then in step 2928 the call associated temporary signaling connection is delivered to the terminating user 122B (CPE B) in a setup message from terminating inter-exchange carrier switch 108 (Switch B) as shown in FIG. 30.

Upon receipt of their respective setup messages, originating inter-exchange carrier switch 104 (Switch B) and terminating user customer premises equipment 122B (CPE B) reply using a call proceeding message.

Additional functionality that may be incorporated into the invention as an alternative embodiment will allow terminating customer premises equipment 122 (CPE B) to send an indication if it can support user-to-user information messages during the call setup. This is accomplished using a facility acknowledge message. The facility acknowledge message is sent to terminating inter-exchange carrier switch 108 (Switch B) and is ultimately forwarded to originating customer premises equipment 122A (CPE A) via originating inter-exchange carrier switch 104 (Switch A). Alternatively, this is accomplished by a facility accepted message being sent from terminating switch 108 (Switch B) to originating switch 104 (Switch A). The facility accepted message is an ISUP message and is made via signaling network 112. The facility accepted message includes call associated temporary signaling connection coding in the network-specific facilities information element. Examples of the coding are terminating switch identification, terminating trunk group, and Link_id as generic digits (GDs) parameters in the initial address message.

Once the requesting party receives the acknowledgment, the transfer of user-to-user information can take place. This is accomplished by the sending party encapsulating ISDN user messages with a header that preferably includes the following information: (1) a SWID/TG (switch identification/trunk group) of the receiving party; (2) the Link id received in the initial address message; (3) a network call identifier, if needed; and (4) addressing information of the switch serving the received party, for example, a TCP/IP address.

Figure 31:
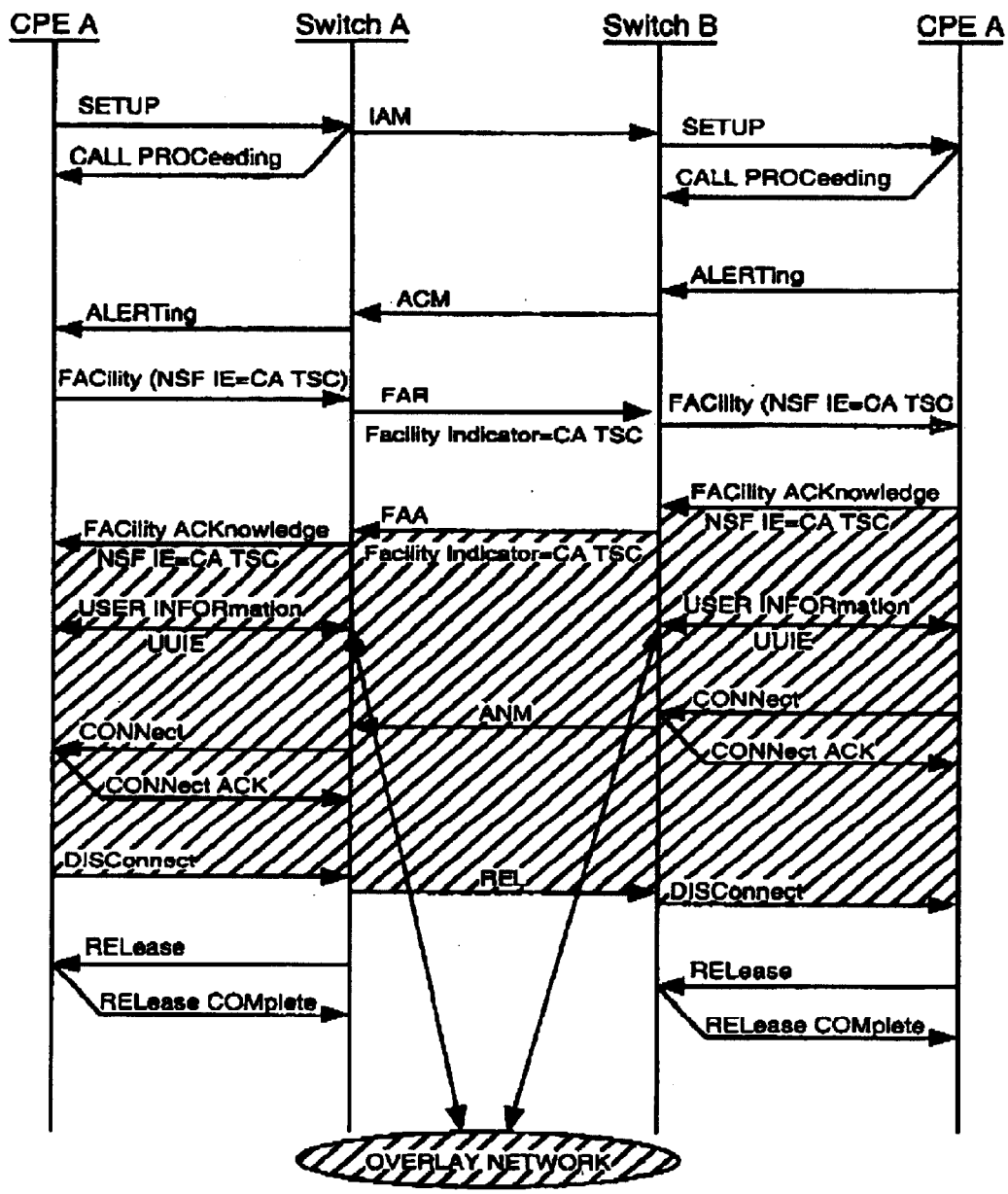
FIG. 31 depicts a call flow diagram illustrating messaging that occurs during the process of handling a call associated temporary signaling connection after setup time according to one embodiment of the invention.

In the scenario where call associated temporary signal connection is requested after setup, either user can request it. FIG. 31 is a call flow diagram illustrating messaging that occurs during the process of handling a call associated temporary signaling connection request after setup time. The originating party can request a call associated temporary signaling connection anytime after receiving an alert message from originating inter-exchange carrier switch 104. The terminating party can request a temporary signaling connection anytime after sending the call proceeding message that confirms channel identity.

The request is not included in the original setup message, because the call is already established. Instead, the requesting party (originating or terminating) sends a separate facility request message to the requested party. In one embodiment, the facility request message, for example, may include the request in the binary facility coding value field of the network-specific facilities information element. The request is transmitting from the requester's switch (Switch B) to the requestee's switch (Switch A) as described above. However, instead of being included in the initial address message, it is included in the facility request message. The availability of resources is determined and the appropriate rejection or acknowledgment is made to the requester as described above with reference to steps 2912 through 2924.

It is possible in an alternative embodiment of the invention to require an acknowledgment message must be received by the requesting party from the requested party before a user-to-user information message may be transferred. For this example, the acknowledgment is referred to as a facility acknowledgment message. The facility acknowledgment message in response to a call associated temporary signaling connection request can be sent anytime after the call proceeding message has been sent. Preferably, the facility acknowledgment message includes call associated temporary signaling connection coding in the network-specific facilities information element.

Another alternative embodiment is that if a call associated temporary signaling connection request is rejected by a switch somewhere in the call path, the subsequent setup messages continuing toward the terminating user will not include the call associated temporary signaling connection request. Thus, when a call associated temporary signaling connection request contained in a facility message is rejected, the facility message will not be sent past the switch rejecting the request. In other words, the message will not be propagated any further to another switch and/or to customer premises equipment 122B by the switch rejecting the request.

Preferably, the facility reject message includes a network-specific facilities information element indicating the rejection and a cause identification element indicating the cause of the rejection. Examples of causes can include: call rejected, facility rejected, switching equipment congestion, requested facility not subscribed, and requested facility not implemented.

Preferably, call associated temporary signaling connection acknowledgments are in response to a setup message or a facility message. In either case, a positive acknowledgment of the request message is a facility acknowledge message, which causes processing of the call associated temporary signaling connection request to proceed. Negative acknowledgments include a facility reject message, a disconnect message, and a release complete message. A negative acknowledgment by way of a facility reject message causes rejection of the call associated temporary signaling connection, but allows processing of a B-channel request (a request to set up a voice path) to continue normally. A negative acknowledgment via either the disconnect message or the release complete message results in rejection of the call associated temporary signaling connection request and clearing of the B-channel connection.

j. Billing

The invention is adaptable to include the capability of keeping track of usage for the purpose of billing parties/users for transferring data and information. Thus, if non-call associated temporary signal connection is invoked, then the user-to-user signaling type field is set to zero and the user-to-user information element count field has a non-zero value.

The non-call associated temporary signal connection may be billed, for example, for each user-to-user information element forwarded by the switch, length of connection time, or some other similar basis. In step 3202, the originating and terminating switches will maintain a counter to count the number of user-to-user information element delivered on a per call basis. In step 3204, each switch preferably will count all user-to-user information elements in either direction whether delivered or not to bill a billing party for the service provided. As one of ordinary skill in the art will appreciate, the billing party can include one or both users or a third party depending on how the invention is implemented in a particular system/network. The billed party will be responsible for paying for the user-to-user information element transport.

The switch preferably will close the billing record when the non-call associated temporary signal connection is brought down by at least one of the users or by the network, for example, when the user-to-user information element count has reached the maximum allowable count. The switch preferably will also close the billing record every time the number of messages transferred in both directions equals a multiple of some predetermined number to prevent the billing party from not being billed for a continuous connection. The switch may reset the user-to-user information element count to zero in the subsequent billing records depending on how the billing capability is implemented. If the terminating user rejects a non-call associated temporary signal connection invocation by sending a release or a release complete message prior to sending a connect message then the user-to-user information element count will be pegged. This is necessary to prevent the fraudulent use of non-call associated temporary signal connection service.

k. Troubleshooting

In an alternative embodiment, various reports, logs, error messages and troubleshooting functions are provided. This information may be stored for latter use and/or provide a continuous stream of information for review by a technician. Also, this information will be of assistance in determining whether additional bandwidth needs to be added to provide sufficient bandwidth based on the amount of use. Most likely this information will be compiled at each switch within the network.

A trunk group counter will be incremented in the event a congestion control message with "receiver not ready" indication is sent by the network due to flow control procedures. A new report will be generated when the network sends a congestion control message due to flow control. This report will indicate the congestion level indication, i.e., "receiver ready" or "receiver not ready" and the trunk group/PRA information.

Another trunk group counter will be incremented in the event a temporary signal connection request is rejected/denied by the network. A report will be generated in the event a temporary signal connection request is rejected/denied by the network. The report will indicate the reason for rejection, i.e., "user not subscribed," "terminating agency not temporary signal connection capable," and "simultaneous temporary signal connection limit invoked is reached."

A new error report will be generated in the event of a temporary signal connection clearing by the network, i.e., when the limit on the number of user-to-user information transfer allowed per call has been exceeded.

A new threshold error report will be generated by the switch whenever the simultaneous temporary signal connection count reaches 80% value of the simultaneous temporary signal connection parameter. This error report will indicate that the "limit on number of simultaneous temporary signal connection invoked" is approaching.

A command interface tool will be provided to monitor various non-call associated temporary signal connections that are active on a given the signaling network route. The output of this tool will contain the following information: common language location identifier, circuit identification, and the number of active non-call associated temporary signal connections.

TABLE 1

V. TABLES AND TECHNICAL INFORMATION

| Index (Switch ID) | Outgoing Circuit Information | Active NCA Connections | |
|---|---|---|---|
| | | TG, PRA # & linkID_1 at Orig i/f | TG, PRA # & linkID_2 at Term i/f |
| switch 1 | circuit info. 1 | call ref 1 : call ref $m_i$ | call ref 1 : call ref $m_l$ |
| switch 2 | circuit info. 2 | call ref 1 : call ref $m_{ii}$ | call ref 1 : call ref $m_{ii}$ |
| switch n-1 | circuit info. n-1 | call ref 1 : call ref $m_{iii}$ | call ref 1 : call ref $m_{iii}$ |

The following discussion provides further explanation and information regarding implementing the exemplary embodiment for non-call associated temporary signal connections discussed above and as such should not be construed to limit the scope of this invention. In the tables below, M represents mandatory items and O represents optional items.

Preferably when the interface between the user originating user-to-user information and switch and the user receiving user-to-user information is PRI, then the messages contain the type of information as discussed below for each message. The discussion is divided into DSS1 messages, DSS1 information elements, ISUP messages, ISUP parameters, and interworking between SS7/ISUP and DSS1. Any reference to notes within the tables is for notes that follow the respective table.

a. DSS1 Messages

1. Congestion Control

Significance: global

Direction: both

TABLE 2

Congestion Control Message Content

| Information Element | Direction | Type | Length |
|---|---|---|---|
| Protocol discriminator | both | M | 1 |
| Call reference | both | M | 2–3 |
| Message type | both | M | 1 |
| Congestion level | both | M | 1 |
| Cause | both | M | 4–22 |

2. Connect

Significance: global

Direction: both

TABLE 3

Connect Message Content

| Information Element | Direction | Type | Length |
|---|---|---|---|
| Protocol discriminator | both | M | 1 |
| Call reference | both | M | 2–3 |
| Message type | both | M | 1 |
| Channel Identification | both | O (Note 1) | 4-8 |
| Redirecting number | both | O (Note 2) | 3–17 |
| Shift to Codeset 6 (locking) | both | O (Note 3, 4) | 1 |
| Network -specific Codeset | both | O (Note 3,4) | 1–128 |
| Shift to codeset 7 (locking) | both | O (Notes 3, 4) | 1 |
| User-specific (codeset 7) | both | O (Notes 3, 4) | 1–128 |

Note 1: Mandatory if this is the first message in response to a setup message.
Note 2: Used to identify address of redirection.
Note 3: Included in the user-to-network direction when the answering user wants to return user-to-user information to the calling user. Included in the network-to-user direction if the user awarded the call included user-to-user information in the connect message.
Note 4: Multiple codeset 6 and 7 information elements may be present. Any codeset 6 or 7 information element may be preceded by an appropriate locking shift information element.

3. Facility Reject

Significance: dual

Direction: both

TABLE 4

Facility Reject Message Content

| Information Element | Direction | Type | Length |
|---|---|---|---|
| Protocol discriminator | both | M | 1 |
| Call reference | both | M | 2–3 |
| Message type | both | M | 1 |
| Cause | both | M | 4–22 |
| Network-specific facilities | both | O | 4–9 |

4. Release

Significance: local (Note 1)

Direction: both

TABLE 5

Release Message Content

| Information Element | Direction | Type | Length |
|---|---|---|---|
| Protocol discriminator | both | M | 1 |
| Call reference | both | M | 2-* |
| Message type | both | M | 1 |
| Cause | both | O (Note 2) | 2–32 |
| User-to-user | both | O (Note 3) | 3–131 |
| Shift to codeset 7 (locking) | both | O (Notes 3, 4) | 1 |
| User-specific (codeset 7) | both | O (Note 3, 4) | 1–128 |

Note 1: This message has local significance; however, it may carry information of global significance when used as the first call clearing message for a non-call associated temporary signal connection
Note 2: Mandatory in the first call clearing message.
Note 3: Included in the first call clearing message when the user initiates call clearing and wants to pass information to the remote user at the call clearing time. This is applicable when MAUUI is invoked.
Note 4: Multiple codeset 7 information elements may be present. Any codeset 7 information element will be preceded by an appropriate locking shift information element.

5. Release Complete

Significance: local (Note 1)

Direction: both

TABLE 6

Release Complete Message Content

| Information Element | Direction | Type | Length |
|---|---|---|---|
| Protocol discriminator | both | M | 1 |
| Call reference | both | M | 2-* |
| Message type | both | M | 1 |
| Cause | both | O (Note 2) | 2–32 |
| User-to-user | both | O (Note 3) | 3–131 |
| Shift to codeset 7 (locking) | both | O (Notes 3, 4) | 1 |
| User-specific (codeset 7) | both | O (Note 3, 4) | 1–128 |

Note 1: This message has local significance; however, it may carry information of global significance when used as the first call clearing message for a non-call associated temporary signal connection.
Note 2: Mandatory in the first call clearing message.
Note 3: Included in the first call clearing message when the user initiates call clearing and wants to pass information to the remote user at the call clearing time.
Note 4: Multiple codeset 7 information elements may be present. Any codeset 7 information element will be preceded by an appropriate locking shift information element.

6. setup

Significance: global

Direction: both

TABLE 7

Setup Message Content

| Information Element | Direction | Type | Length |
|---|---|---|---|
| Protocol discriminator | both | M | 1 |
| Call reference | both | M | 2-* |
| Message type | both | M | 1 |
| Bearer Capability | both | M | 4–13 |
| Channel Identification | both | O | 2-* |
| Network-specific facilities | both | O | 2-* |
| Calling Party Number | both | O | 2-* |
| Calling Party Subaddress | both | O | 2–23 |
| Called Party Number | both | O | 2-* |
| Called Party Subaddress | both | O | 2–23 |
| Lower Layer compatibility | both | O | 2–16 |
| High Layer compatibility | both | O | 2–4 |
| Shift to Codeset 6 (locking) | both | O | 1 |
| Network -specific Codeset | both | O | 1–128 |
| Shift to codeset 7 (locking) | both | O | 1 |
| User-specific (codeset 7) | both | O | 1–128 |
| User-to-User | both | O | 1–128 |

7. User Information

Significance: access

Direction: both

TABLE 8

User Information Message Content

| Information Element | Direction | Type | Length |
|---|---|---|---|
| Protocol discriminator | both | M | 1 |
| Call reference | both | M | 2–3 |
| Message type | both | M | 1 |
| More data | both | O (Note 1) | 1 |
| User-to-user | both | M (Note 2) | 3–251 |
| Shift to Codeset 6 (locking) | both | O (Note 3) | 1 |
| Network-specific (codeset 6) | both | O (Note 3) | 1–128 |
| Shift to Codeset 7 (locking) | both | O (Note 3) | 1 |
| User-specific (locking) | both | O (Note 3) | 1–128 |

TABLE 8-continued

User Information Message Content

| Information Element | Direction | Type | Length |
|---|---|---|---|

Note 1: Included by the sending user to indicate that another user information message pertaining to the same message block will follow.
Note 2: The network restriction on the length of this information element is 131 or 251 octets depending on the message type. For user information message it can be up to 251 octets and for all other message type for which it is permitted it can be up to 131 octets.
Note 3: Multiple codeset 6 and 7 information elements may be present. Any codeset 6 or 7 information elements may be preceded by an appropriate locking shift information element.

b. DSS1 Information Elements Coding

1. Bearer Capability

Bearer capability information element is encoded as follows to invoke non-call associated temporary signal connection:

Information Transfer Capability (Octet 3)

| Bits | | | | | |
|---|---|---|---|---|---|
| 5 | 4 | 3 | 2 | 1 | |
| 0 | 1 | 0 | 0 | 0 | Unrestricted digital information |

Transfer Mode (Octet 4)

| Bits | | |
|---|---|---|
| 7 | 6 | |
| 1 | 0 | Packet mode |

Information Transfer Rate (Octet 4)

| Bits | | | | | |
|---|---|---|---|---|---|
| 5 | 4 | 3 | 2 | 1 | |
| 0 | 0 | 0 | 0 | 0 | Used for packet mode calls |

User Information Layer 2 Protocol (Octet 6)

| Bits | | | | | |
|---|---|---|---|---|---|
| 5 | 4 | 3 | 2 | 1 | |
| 0 | 0 | 0 | 1 | 0 | CCITT recommendation Q.921 |

User Information Layer 3 Protocol (Octet 7)

| Bits | | | | | |
|---|---|---|---|---|---|
| 5 | 4 | 3 | 2 | 1 | |
| 0 | 0 | 0 | 1 | 0 | CCITT recommendation Q.931 |

TABLE 9

Bearer Capability Information Element

| 8 | 7 | 6 | 5 | 4 | 3 | 2 | 1 | Octet |
|---|---|---|---|---|---|---|---|---|
| Bearer capability | | | | | | | | 1 |
| 0 | 0 | 0 | 0 | 0 | 1 | 0 | 0 | |
| information element identifier | | | | | | | | |
| Length of bearer capability contents | | | | | | | | 2 |
| 1 ext | Coding standard | | Information transfer capability | | | | | 3 |
| 1 | 0 | 0 | 0 | 1 | 0 | 0 | 0 | |
| 0/1 ext | Transfer mode | | Information transfer rate | | | | | 4 |
| 1 | 1 | 0 | 0 | 0 | 0 | 0 | 0 | |
| 0/1 ext | Layer 1 identification | | User information Layer 1 Protocol | | | | | 5 Note 1 |
| 1 | 0 | 1 | 0 | 0 | 0 | 1 | 0 | |
| 1 ext | Layer 2 identification | | User information Layer 2 Protocol | | | | | 6 Note 2 |
| 1 | 1 | 0 | 0 | 0 | 0 | 1 | 0 | |
| 1 ext | Layer 3 identification | | User information Layer 3 Protocol | | | | | 7 Note 2 |
| 1 | 1 | 1 | 0 | 0 | 0 | 1 | 0 | |

Note 1: Octet 5 may be omitted for packet mode.
Note 2: Octets 6 and 7 optionally may be included by the user. Network will ignore Octets 6 and 7.

2. Congestion Level

The purpose of congestion level information element is to indicate the congestion status of the call. It is a single octet information element and can take two values: receiver ready or receiver not ready.

TABLE 10

Congestion Level Information Element

| 8 | 7 | 6 | 5 | 4 | 3 | 2 | 1 |
|---|---|---|---|---|---|---|---|
| 1 | Congestion level IE identifier | | | Congestion Level | | | |
| | 0 | 1 | 1 | | | | |

Congestion Level (octet 1, Bits 4 through 1)

| Bits | | | | |
|---|---|---|---|---|
| 4 | 3 | 2 | 1 | |
| 0 | 0 | 0 | 0 | receiver ready |
| 1 | 1 | 1 | 1 | receiver not ready |

3. More data

The presence of the More data information element indicates to the far end user that another user information message will follow, containing information belonging to the same block.

The network does not supervise the use of the more data information element.

TABLE 11

More data information element

| 8 | 7 | 6 | 5 | 4 | 3 | 2 | 1 | |
|---|---|---|---|---|---|---|---|---|
| | More data | | | | | | | |
| 1 | 0 | 1 | 0 | 0 | 0 | 0 | 0 | |
| | Information element identifier | | | | | | | |

4. User-to-User Information Element

The user-to-user information element is coded as shown in Table 1. There are no restrictions on the content of the user-to-user information field.

In setup, release, release complete messages, the user-to-user information element has a network dependent maximum size of 131 octets.

In user information message in association with a temporary User-user signaling connection, the user-to-user information field contained in this message has a maximum size equal to 251 octets.

TABLE 12

User-to-User Information Element

| 8 | 7 | 6 | 5 | 4 | 3 | 2 | 1 | |
|---|---|---|---|---|---|---|---|---|
| | User-to-user | | | | | | | |
| 0 | 1 | 1 | 1 | 1 | 1 | 1 | 0 | Octet 1 |
| | Information element identifier | | | | | | | |
| Length of user-to-user contents | | | | | | | | 2 |
| Protocol discriminator | | | | | | | | 3 |
| User information | | | | | | | | |
| etc. | | | | | | | | |

Protocol discriminator is coded is 0 0 0 0 0 0 0 0 to indicate User Specific protocol.

c. ISUP Messages

In the exemplary embodiments described above, network-specific generic digits OSID/OTG, TSID/TTG and DSS1 link identification parameters will always be present in ANM, CPG, FAA, FAR, REL, RLC, and USR messages.

1. Call Progress (CPG)

TABLE 13

Call Progress (CPG) Message Content

| Parameter | Type | Length |
|---|---|---|
| Message Type | F | 1 |
| Event Information | F | 1 |
| Cause Indicators | O | 4-n |
| Congestion level | O | 1 |
| NSGD (DSS1 Link Identification) | O | 4–6 |
| NSGD (OSID/OTG) | O | 6 |
| NSGD (TSID/TTG) | O | 6 |
| End of Optional Parameters | O | 1 |

2. Facility Accepted (FM)

TABLE 14

Facility Accepted (FAA) Message Content

| Parameter | Type | Length |
|---|---|---|
| Message Type | F | 1 |
| Facility Indicator | F | 1 |

TABLE 14-continued

Facility Accepted (FAA) Message Content

| Parameter | Type | Length |
|---|---|---|
| NSGD (DSS1 Link Identification) | O | 4–6 |
| NSGD (OSID/OTG) | O | 6 |
| NSGD (TSID/TTG) | O | 6 |

3. Facility Request (FAR)

TABLE 15

Facility Request (FAR) Message Content

| Parameter | Type | Length |
|---|---|---|
| Message Type | F | 1 |
| Facility Indicator | F | 1 |
| Access Transport | O | 3-n |
| Business Group | O | 9 |
| Called Party Number | O | 4–18 |
| Calling Party Number | O | 5–12 |
| Calling Party's Category | O | 1 |
| Carrier Identification | O | 5 |
| Carrier Selection Information | O | 3 |
| Cause Indicator | O | 4-n |
| Charge Number | O | 5–14 |
| Generic Address | O | 6–13 |
| Generic Digits | O | 6–13 |
| NSGD (DSS1 Link Identification) | O | 4–6 |
| NSGD (Network Call ID) | O | 13-n |
| NSGD (OSID/OTG) | O | 6 |
| NSGD (TSID/TTG) | O | 6 |
| User-to-User Information | O | 4-n |
| End of Optional Parameters | O | 1 |

4. User-to-User Information (USR)

TABLE 16

User-to-user Information (USR) Message Content

| Parameter | Type | Length |
|---|---|---|
| Message Type | F | 1 |
| User-user | V | 3–251 |
| Access Transport | O (Note 1) | 3-n |
| NSGD (DSS1 Link Identification) | O | 4–6 |
| NSGD (OSID/OTG) | O | 6 |
| NSGD (TSID/TTG) | O | 6 |
| End of Optional Parameters | O | 1 |

Note 1: Access transport may carry more data, locking shift to codeset 6, codeset 6, locking shift to codeset 7, and codeset 7 information elements.

d. ISUP Parameters

1. User-User Information

Code: 0 0 1 0 0 0 0 0

Type: Variable

Appears in Messages: IAM, REL, and USR

The user-user information is coded similar to the user-to-user information element discussed above.

In initial address and release messages the user-user information has a network dependent maximum size of 131 octets.

In user information message in association with a temporary User-user signaling connection, the user-user information field contained in this message has a maximum size equal to 251 octets.

2. Congestion Level: Network-specific generic digits
Appears in Message: CPG
The congestion level parameter is coded as follows:

TABLE 17

Congestion Level Parameter

| 8 | 7 | 6 | 5 | 4 | 3 | 2 | 1 |
|---|---|---|---|---|---|---|---|
| 1 | Congestion Level Identifier 0 1 1 | | | Congestion Level | | | |

Congestion Level (octet 1, Bits 4 through 1)

| Bits | | | | |
|---|---|---|---|---|
| 4 | 3 | 2 | 1 | |
| 0 | 0 | 0 | 0 | receiver ready |
| 1 | 1 | 1 | 1 | receiver not ready |

3. Facility Indicator

Type: Fixed

Appears in Messages: FAA, FAR

TABLE 18

Facility Indicator Parameter

| 8 | 7 | 6 | 5 | 4 | 3 | 2 | 1 |
|---|---|---|---|---|---|---|---|
| Facility Indicator | | | | | | | |

| Binary | Description |
|---|---|
| 0001 1010 | Non-Call Associated Temporary Signaling Connection (non-call associated temporary signal connection) |
| 0001 1011 | Notification of non-call associated temporary signal connection clearing or resource not available |

4. DSS1 Link Identification: Network-specific generic digits Appears in Messages: ANM, CPG, FAA, FAR, REL. The DSS1 Link Identification parameter is coded as follows:

TABLE 19

DSS1 Link Identification Parameter

| Octets | 8 | 7 | 6 | 5 | 4 | 3 | 2 | 1 |
|---|---|---|---|---|---|---|---|---|
| 1 | PRA Number (linkID__1) | | | | Length of linkID__1 value (in octets) | | | |
| 2 2a | Flag 1 | linkID__1 value | | | | | | |
| 3 | PRA Number (linkID__2) | | | | Length of linkID__2 value (in octets) | | | |
| 4 4a | Flag 2 | linkID__2 value | | | | | | |

PRA Number (linkID__1) (octet 1, bits 5–8) identifies the D-Channel in a trunk group that controls the temporary signal connection at the originating interface.

Length of linkID__1 (octet 1) is the length in octets of call reference at the originating interface.

Call Reference Flag 1 (Octet 2)

Bit 8

0 = The message is sent from the side that originated the call reference.
1 = The message is sent to the side that originates the call reference.

LinkID__1 value (octet 2, 2*a*) is the integer value of call reference at the originating interface. It can be any value in the range {−32768 . . . 32768}.

PRA Number (linkID__2) (octet 3, bits 5–8) identifies the D-Channel in a trunk group that controls the temporary signal connection at the terminating interface.

Length of linkID__2 (octet 3) is the length in octets of call reference at the terminating interface.

Call Reference Flag 2 (Octet 4)

Bit 8

0 = The message is sent from the side that originated the call reference.
1 = The message is sent to the side that originates the call reference.

LinkID__2 value (octet 4, 4*a*) is the integer value of call reference at the terminating interface. It can be any value in the range {−32768 . . . 32768}.

e. Interworking Between SS7/ISUP and DSS1

Preferably, SS7/ISUP protocol will be used whenever interworking is encountered for control of non-call associated temporary signal connections, transport of user-to-user signaling information, and congestion control. The following tables describe the necessary mapping of DSS1 messages/information elements to ISUP messages/parameters.

TABLE 20 non-call associated temporary signal connection control mapping

| SS7 ISUP Messages | DSS1 Messages |
|---|---|
| IAM, FAR | setup |
| FAA | connect |
| REL, FAR | release, release complete |

TABLE 21

Transport mapping

| SS7/ISUP | DSS1 |
|---|---|
| USR | user information |

TABLE 22

| Transport mapping | |
| --- | --- |
| SS7 (ISUP Parameter) | DSS1 (Information Element) |
| UU | UUIE |
| ATP | More data |

TABLE 23

| Congestion Control | |
| --- | --- |
| SS7/ISUP | DSS1 |
| CPG (Note 1) | congestion control |

Note 1: The event indicator field will be encoded as "notification of supplementary service" and the restrict field will be set to "no indication" in the event information parameter.

TABLE 24

| Congestion Control | |
| --- | --- |
| SS7 (ISUP Parameter) | DSS1 (Information Element) |
| NSGD (Congestion Level) | Congestion Level |

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A communications network comprising:
  at least first and second switches, each of said first and second switches having a database that stores connection information,
  a signaling network connecting said first and second switches, and
  a voice network connecting said first and second switches; and wherein said first and second switches update the respective databases when at least one of the following occurs:
    (a) a path over each of said signaling network and said voice network is established,
    (b) a connection over an established path on one of said signaling network and said voice network is established,
    (c) a connection over one of said signaling network and said voice network is released, and
    (d) the path over said signaling network and the path over said voice network are cleared.

2. The communications network of claim 1, further comprising at least one data access point in communication with at least one of said first and second switches, wherein
  said first switch contacts said data access point for accessing routing information to establish an initial signaling path on said signaling network to said second switch and an initial voice path on said voice network to said second switch, said first and second switches using the initial signaling path and the initial voice path for additional connection requests while the initial signaling path and the initial voice path remain active.

3. The communications network of claim 1, wherein said first switch establishes an initial signaling path on said signaling network to said second switch and an initial voice path on said voice network to said second switch responsive to a first connection request, and
  in response to a further connection request involving said first and second switches being received, said first and second switches using the initial signaling path and the initial voice path when at least one of the initial signaling path and the initial voice path is in use.

4. The communications network of claim 1, wherein information sent to one of said first and second switches is transmitted over the signaling path on said signaling network to the other of said first and second switches.

5. The communications network of claim 1, wherein when multiple connections exist between said first and second switches, information from at least one connection will be transmitted over the path created in response to a first connection request on said voice network by said first and second switches.

6. The communications network of claim 1, further comprising
  a first interface system in communication with said first switch, said first interface system includes a decoder and a multiplexer connected to the decoder, and
  a second interface system in communication with said second switch, said second interface system includes a decoder and a multiplexer connected to the decoder.

7. The communications network of claim 1, further comprising an interface system in communication with one of said first and second switches, said interface system includes a decoder and a multiplexer connected to the decoder.

8. The communications network of claim 1, further comprising a congestion controller in communication with at least one of said first and second switches, said congestion controller propagates a message along at least one of the signaling path and voice path in response to said congestion controller detecting congestion existing at said switch and said switch is requested to transmit information along one of the signaling path and the voice path.

9. The communications network of claim 1, wherein each database includes a relationship database having the following information:
  a list of switches with which at least one of a signaling path and a voice path exists from the switch in which the database resides,
  information regarding devices connected to the switch in which the database resides and the switches included in the list of switches, and
  a circuit identification code for each voice path involving the switch in which the database resides.

10. A method for establishing multiple connections comprising:
  (a) receiving a first connection request from a first device at a first switch,
  (b) establishing a first connection between the first switch and the first device,
  (c) entering connection and circuit information into a first database,
  (d) establishing a signaling path between the first switch and a second switch,
  (e) establishing a voice path between the first switch and the second switch,
  (f) establishing the first connection between the second switch and a second device,
  (g) entering connection and circuit information into a second database,
  (h) receiving a second connection request from a third device for communication between the first switch and the second switch at at least one of the first switch and the second switch,
(i) checking the database of the switch receiving the second connection request,
(j) establishing a second connection between the switch receiving the second request and the third device,
(k) establishing communication through at least one of the signaling path and the voice path previously established between the first switch and the second switch, and
(l) establishing the second connection between the other of said first and second switches and a fourth device.

11. The method of claim 10, wherein the first device is at least one of the third device and the fourth device.

12. The method of claim 10, wherein the second device is at least one of the third device and the fourth device.

13. The method of claim 10, further comprising:
releasing at least one of the first connection and the second connection, and
releasing the other of the first connection and the second connection.

14. The method of claim 13, wherein
a requesting device is one of the first device, the second device, the third device and the fourth device
a releasing switch is at least one of the first switch and the second switch closest to the requesting device and a remote switch is the other of the first switch and the second switch, and
a remote device is one of the first device, the second device, the third device, and the fourth device connected to the remote switch and in communication with the requesting device; and
the first releasing step includes
generating a request to release the connection between the requesting device and the releasing switch,
releasing the connection between the requesting device and the releasing switch
relaying the release request to the remote switch from the releasing switch,
releasing the connection between the remote switch and remote device, and
updating the databases to reflect the released connection between the first and second switches.

15. The method of claim 13, wherein
a releasing switch is at least one of the first switch and the second switch closest to the requesting device and a remote switch is the other of the first switch and the second switch,
a near device is one of the first device, the second device, the third device and the fourth device connected to the releasing switch, and
a remote device is one of the first device, the second device, the third device, and the fourth device connected to the remote switch and in communication with the near device; and
the first releasing step includes
releasing the connection between the hear device and the releasing switch,
sending a release notice to the remote switch from the releasing switch,
releasing the connection between the remote switch and remote device, and
updating the databases to reflect the released connection between the first and second switches.

16. The method of claim 13, wherein
a requesting device is one of the first device, the second device, the third device and the fourth device,
a releasing switch is at least one of the first switch and the second switch closest to the requesting device and a remote switch is the other of the first switch and the second switch, and
a remote device is one of the first device, the second device, the third device, and the fourth device connected to the remote switch and in communication with the requesting device; and
the second releasing step includes
generating a release request to release the connection between the requesting device and the releasing switch,
releasing the connection between the requesting device and the releasing switch,
clearing both the signaling path and the voice path between the releasing and remote switches when this is the last connection over both the signaling and voice paths between the releasing and remote switches,
relaying the release request to the remote switch to end the connection with the remote device when there are multiple connections over the signaling and voice paths between the releasing and remote switches,
releasing the signaling connection between the remote switch and the remote device, and
updating the databases to reflect the second releasing step.

17. The method of claim 13, wherein
a releasing switch is at least one of the first switch and the second switch closest to the requesting device and a remote switch is the other of the first switch and the second switch,
a near device is one of the first device, the second device, the third device and the fourth device connected to the releasing switch, and
a remote device is one of the first device, the second device, the third device, and the fourth device connected to the remote switch and in communication with the near device; and
the second releasing step includes
releasing the connection between the releasing switch and the near device,
clearing both the signaling path and the voice path between the releasing and remote switches when this is the last connection over both the signaling and voice paths between the releasing and remote switches,
relaying the release request to the remote switch to end the connection with the remote device when there are multiple connections over the signaling and voice paths between the releasing and remote switches,
releasing the signaling connection between the remote switch and the remote device, and
updating the databases to reflect the second releasing step.

18. The method of claim 13, wherein
a requesting device is one of the first device, the second device, the third device and the fourth device,
a releasing switch it as least one of the first switch and the second switch closest to the requesting device and a remote switch is the other of the first switch and the second switch, and
a remote device is one of the first device, the second device, the third device, and the fourth device connected to the remote switch and in communication with the requesting device; and the first and the second releasing steps include
sending of a release request from the requesting device to the releasing switch,
acknowledging of the release request by the releasing switch to the requesting device,
relaying the release request to the remote switch from the releasing switch,
sending the release request from the remote switch to the remote device, and
acknowledging of the release request by the remote device to the remote switch.

19. The method of claim 10, further comprising repeating steps (h) through (l) for each new requested connection received at at least one of the first switch and the second switch for a connection to another device at the other of the first and second switches while at least one of the signaling path and the voice path is up between the first switch and the second switches.

20. The method of claim 19, further comprising
determining whether addition of the new requested connection will exceed a combined capacity of the signaling path and the voice path established between the first switch and the second switch,
establishing a second signaling path and a second voice path between the first switch and the second switch when the combined capacity is exceeded, and
allocating the new requested connection on at least one of the signaling path and the voice path when the combined capacity is not exceeded.

21. The method of claim 10, further comprising:
transferring information between the first and second devices through the first and second switches,
notifying at least one of the first device, the second device, the first switch, and the second switch involved in a connection by a congested component when information is sent to the congested component; wherein
the congested component is at least one of the first device, the second, the first switch, the second switch, and an intermediary network component between the first switch and the second switch.

22. The method of claim 21, wherein notifying includes determining the existence of the congested state when at least one of the following occurs: a bandwidth of one of the switches is exceeded, one of the devices is unable to receive additional information, and the level of transferred information has exceeded a predetermined number of transfers over a period of time.

23. The method of claim 21, further comprising notifying the other components when the congested component becomes uncongested.

24. The method of claim 10, further comprising:
transferring information between the first and second devices through the first and second switches,
tracking an amount of information transferred at least one of the first switch and the second switch for each connection, and
billing for the amount of information transferred to a respective account for each connection.

25. The method of claim 10, wherein
step (f) establishes the first connection when the second device is available for the first connection, and
step (l) establishes the second connection when the fourth device is available for the second connection.

26. A communications network, comprising
a first switch,
a second switch,
a voice network connecting said first switch with said second switch,
a signaling network connecting said first switch with said second switch; wherein said first switch includes
means for receiving a connection request from a first device to transfer information to a second device,
means for establishing a connection between the first device and said first switch,
means for establishing a voice path over said voice network to said second switch,
means for establishing a signaling path over said signaling network to said second switch, and
first storing means for storing connection and path information;
said second switch includes
means for establishing a connection with the second device, and
second storing means for stored connection and path information; and
each of said first switch and said second switch further including
means for receiving additional connection requests for communication,
means for determining if a connection currently exists between said first switch and said second switch when the additional connection travels over at least one of the voice path and the signaling path between said first and second switches based on connection and path information in at least one of said first storing means and said second storing means,
means for establishing a connection responsive to each additional connection request over at least one of the signaling path and the voice path.

27. The communications network of claim 26, wherein said first switch further includes:
means for releasing the connection between the first device and said first switch, and
means for notifying said second switch to end the connection with the second device.

28. The communications network of claim 27, wherein said releasing means includes means for clearing both the signaling path and the voice path when the connection requested to be released is a last connection between said first and second switches based on connection and path information in said first storing means.

29. The communications network of claim 26, wherein said second switch further includes:
means for releasing the connection between the second device and said second switch, and
means for notifying said first switch to end the connection with the first device.

30. The communications network of claim 29, wherein said releasing means includes means for clearing both the signaling path and the voice path when the connection requested to be released is a last connection between said first and second switches based on connection and path information in said second storing means.

31. The communications network of claim 26, wherein said first storing means stores
a list of switches including each switch communicating with said first switch through at least one of the signaling path and a voice path, reference information for devices connected to said first switch and each switch listed in the list of switches, and a circuit identification code for each voice path involving said first switch; and said second storing means stores a list of switches including each switch communicating with said second switch through at least one of a signaling path and a voice path, reference information for devices connected to said second switch and each switch listed in the list of switches, and a circuit identification code for each voice path involving said second switch.

32. The communications network of claim 26, further comprising means for storing routing information, said routing information comprises information for connecting to different locations on said communications network, said means is in communication with at least one of said switches.

33. The communications network of claim 26, further comprising means for assembling data packets for transfer over at least one of the voice path and the signaling path from said first switch to said second switch.

34. The communications network of claim 33, further comprising means for assembling data packets for transfer over at least one of the voice path and the signaling path from said second switch to said first switch.

35. The communications network of claim 26, further comprising means for controlling congestion in said communications network.

36. A switch for facilitating communication between devices on a communications network having a plurality of such switches each connected to at least one device, said switch comprising:

means for receiving from a first device a connection request to a second device, a database having the following information:

a list of switches with which at least one of a signaling path and a voice path exists from said switch, information regarding devices connected to said switch and the switches included in the list of switches, and a circuit identification code for each path involving said switch, means for establishing a signaling path and a voice path to another switch when the other switch is not included within the list of switches in said database, and means for routing the requested connection through at least one of the signaling path and the voice path when the other switch is included in the list of switches in said database.

* * * * *